(12) United States Patent
Witherbee et al.

(10) Patent No.: US 11,248,740 B2
(45) Date of Patent: Feb. 15, 2022

(54) MOUNTING BRACKET

(71) Applicant: Eaton Intelligent Power Limited, Dublin (IE)

(72) Inventors: Martin Lee Witherbee, Godfrey, IL (US); Jacob Lee Johnson, New Baden, IL (US); Karthik Pandurang Shenoy, Bengaluru (IN); Jonathan N. Fore, St. Louis, MO (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 37 days.

(21) Appl. No.: 16/433,952

(22) Filed: Jun. 6, 2019

(65) Prior Publication Data

US 2019/0376643 A1 Dec. 12, 2019

Related U.S. Application Data

(60) Provisional application No. 62/682,524, filed on Jun. 8, 2018, provisional application No. 62/796,287, filed on Jan. 24, 2019.

(51) Int. Cl.
*F16M 13/02* (2006.01)
*H02G 3/14* (2006.01)
*H02G 3/10* (2006.01)

(52) U.S. Cl.
CPC .............. *F16M 13/02* (2013.01); *H02G 3/10* (2013.01); *H02G 3/14* (2013.01)

(58) Field of Classification Search
CPC ............ F16M 13/02; H02G 2/10; H02G 2/14; H02G 2/08; H02G 2/125; H02G 2/126; Y10S 248/906
See application file for complete search history.

(56) References Cited

U.S. PATENT DOCUMENTS 4,533,060 A * 8/1985 Medlin .................. H02G 3/125
220/3.3
4,668,693 A 8/1987 Meldin, Jr.
(Continued)

FOREIGN PATENT DOCUMENTS

AU 2010241518 9/2011
CA 1272522 8/1990
(Continued)

OTHER PUBLICATIONS

Erica H6R1 Electrical Box Mounting Bracket, posted at amazon.com, posting date Dec. 5, 2008, [online], [site visited Jul. 23, 2020]. Available from Internet, URL: https://www.amazon.com/Erico-H6R1-Electrical-Mounting-Bracket/dp/B001N3YB5I (Year: 2008).

(Continued)

*Primary Examiner* — Anita M King
(74) *Attorney, Agent, or Firm* — Stinson LLP

(57) ABSTRACT

A mounting bracket for mounting a junction box to a stud of a wall includes a face plate having opposite left and right edge margins. The face plate attaches to the junction box. A stud mounting flange is coupled to one of the left and right edge margin of the face plate and engages the stud. At least one clamping flange is coupled to the stud mounting flange and is configured to engage the stud. The at least one clamping flange is resiliently deflectable and applies a force to the stud to hold the mounting bracket on the stud when the mounting bracket is mounted to the stud.

13 Claims, 35 Drawing Sheets

(56) References Cited

U.S. PATENT DOCUMENTS

| | | | |
|---|---|---|---|
| 4,706,359 A | 11/1987 | Greenhill, Sr. et al. | |
| 4,757,908 A * | 7/1988 | Medlin, Sr. | H02G 3/126 220/3.7 |
| 4,757,967 A | 7/1988 | Delmore et al. | |
| 4,888,879 A | 12/1989 | Dixon | |
| 4,890,391 A | 1/1990 | Warren | |
| 4,898,357 A | 2/1990 | Jorgensen et al. | |
| 4,943,022 A | 7/1990 | Rinderer | |
| 4,964,525 A | 10/1990 | Coffey et al. | |
| 4,978,092 A | 12/1990 | Nattel | |
| 5,025,944 A | 6/1991 | Rodick | |
| 5,114,105 A | 5/1992 | Young | |
| 5,263,676 A | 11/1993 | Medlin, Jr. et al. | |
| 5,295,644 A | 3/1994 | Ferguson, Jr. | |
| 5,386,959 A | 2/1995 | Laughlin et al. | |
| 5,408,045 A | 4/1995 | Jorgensen et al. | |
| 5,434,359 A | 7/1995 | Schnell | |
| 5,452,873 A | 9/1995 | Laughlin | |
| 5,595,362 A * | 1/1997 | Rinderer | H02B 1/46 220/3.9 |
| 5,603,424 A | 2/1997 | Bordwell et al. | |
| 5,619,263 A | 4/1997 | Laughlin et al. | |
| 5,810,303 A * | 9/1998 | Bourassa | H02G 3/126 174/58 |
| 5,833,110 A | 11/1998 | Chandler et al. | |
| 5,841,068 A | 11/1998 | Umstead et al. | |
| 5,931,425 A | 8/1999 | Oliva | |
| 5,950,853 A | 9/1999 | Jorgensen | |
| 6,105,918 A | 8/2000 | Gromotka | |
| 6,389,658 B1 | 5/2002 | Pfaller et al. | |
| 6,595,479 B2 | 7/2003 | Johnson et al. | |
| 6,666,419 B1 | 12/2003 | Vrame | |
| 6,871,827 B2 * | 3/2005 | Petak | H02G 3/12 174/58 |
| 6,956,172 B2 | 10/2005 | Dinh | |
| 7,025,314 B1 | 4/2006 | Thomas et al. | |
| 7,036,782 B2 | 5/2006 | Cheatham et al. | |
| 7,073,757 B2 | 7/2006 | Johnson et al. | |
| 7,105,742 B1 | 9/2006 | Jolly | |
| 7,112,743 B2 | 9/2006 | Hull et al. | |
| 7,148,420 B1 | 12/2006 | Johnson et al. | |
| 7,179,995 B2 | 2/2007 | Dinh | |
| 7,214,877 B2 | 5/2007 | de la Borbolla | |
| D557,117 S | 12/2007 | Cannaverde | |
| 7,360,745 B2 | 4/2008 | Nikayin et al. | |
| 7,373,730 B2 | 5/2008 | Murphy | |
| 7,388,150 B2 | 6/2008 | Dinh et al. | |
| 7,398,949 B2 * | 7/2008 | Weech | G06F 1/183 248/220.21 |
| 7,439,443 B2 * | 10/2008 | Dinh | H02G 3/126 174/58 |
| 7,472,875 B2 | 1/2009 | Rinderer | |
| 7,501,575 B2 | 3/2009 | Jolly | |
| 7,544,889 B1 | 6/2009 | Sanchez | |
| 7,549,549 B1 | 6/2009 | Kiely | |
| 7,563,989 B1 | 7/2009 | Fils | |
| 7,628,286 B2 | 12/2009 | Lalancette | |
| 7,659,478 B2 | 2/2010 | Schlachter | |
| 7,667,137 B1 | 2/2010 | Beckman | |
| 7,771,094 B2 | 8/2010 | Goode | |
| 7,798,458 B2 | 9/2010 | Borbolla et al. | |
| 7,842,884 B2 | 11/2010 | Johnson | |
| 7,857,275 B2 | 12/2010 | de la Borbolla | |
| 7,923,635 B2 | 4/2011 | Korcz et al. | |
| 8,042,776 B2 | 10/2011 | Johnson | |
| 8,193,446 B1 | 6/2012 | Taylor | |
| 8,253,040 B2 | 8/2012 | Hopkins | |
| 8,328,150 B2 | 12/2012 | Collins et al. | |
| 8,403,289 B1 | 3/2013 | Rinderer | |
| 8,702,047 B2 | 4/2014 | Nuernberger et al. | |
| 8,975,519 B2 | 3/2015 | Lalancette et al. | |
| 8,998,154 B2 | 4/2015 | Lupsa et al. | |
| 9,010,696 B2 | 4/2015 | Siddiqui et al. | |
| D732,939 S | 6/2015 | Cannaverde | |
| 9,106,063 B2 | 8/2015 | Amar | |
| 9,163,782 B2 | 10/2015 | Kerr et al. | |
| 9,261,120 B2 | 2/2016 | Colangelo et al. | |
| 9,300,119 B2 | 3/2016 | Korcz et al. | |
| 9,397,491 B2 | 7/2016 | Birli et al. | |
| 9,444,246 B2 * | 9/2016 | Nakamura | H02H 7/1213 |
| 9,531,175 B2 | 12/2016 | Fowler, Jr. | |
| 9,559,504 B2 * | 1/2017 | Jones | H02G 3/12 |
| 9,562,628 B2 | 2/2017 | Nuernberger | |
| 9,627,867 B2 | 4/2017 | Korcz et al. | |
| 9,748,752 B2 | 8/2017 | Korcz et al. | |
| 9,780,545 B2 | 10/2017 | Witherbee | |
| 9,822,926 B2 | 11/2017 | Nikayin | |
| 9,825,446 B2 | 11/2017 | Korcz et al. | |
| 9,853,431 B2 | 12/2017 | Jones | |
| 9,929,549 B2 | 3/2018 | Witherbee et al. | |
| D821,849 S | 7/2018 | Nikayin et al. | |
| D823,093 S | 7/2018 | Kanter | |
| 10,077,866 B2 * | 9/2018 | Witherbee | H02G 3/125 |
| D835,972 S | 12/2018 | Patil et al. | |
| D841,432 S | 2/2019 | Nikayin et al. | |
| D865,487 S | 11/2019 | DeDios-Shirley et al. | |
| D886,201 S | 6/2020 | Kanter | |
| 2005/0176278 A1 | 8/2005 | Cheatham et al. | |
| 2006/0237601 A1 * | 10/2006 | Rinderer | H02G 3/125 248/200.1 |
| 2007/0200039 A1 | 8/2007 | Petak | |
| 2009/0057303 A1 | 3/2009 | Oddsen et al. | |
| 2010/0006723 A1 | 1/2010 | Frank | |
| 2010/0176138 A1 | 7/2010 | Zacharevitz et al. | |
| 2010/0282933 A1 | 11/2010 | Phillips | |
| 2010/0288554 A1 | 11/2010 | Jafari | |
| 2011/0001026 A1 | 1/2011 | Kubsad et al. | |
| 2012/0018603 A1 | 1/2012 | Kerr | |
| 2013/0312997 A1 | 11/2013 | Korte et al. | |
| 2015/0318677 A1 | 11/2015 | WitherBee | |
| 2015/0333493 A1 | 11/2015 | Jones | |
| 2016/0273706 A1 | 9/2016 | Lupsa et al. | |
| 2016/0360629 A1 | 12/2016 | Witherbee | |
| 2017/0012421 A1 | 1/2017 | Terwilleger | |
| 2017/0077689 A1 | 3/2017 | Korcz et al. | |
| 2017/0187174 A1 | 6/2017 | Witherbee et al. | |
| 2017/0229852 A1 | 8/2017 | Jones et al. | |
| 2017/0256928 A1 | 9/2017 | Korcz et al. | |
| 2017/0294768 A1 | 10/2017 | Thomas et al. | |
| 2018/0062365 A1 | 3/2018 | Kellerman | |
| 2019/0376643 A1 | 12/2019 | WitherBee et al. | |

FOREIGN PATENT DOCUMENTS

| | | |
|---|---|---|
| CA | 1280199 | 2/1991 |
| CA | 2211583 | 7/2003 |
| CA | 2828367 | 3/2014 |
| EP | 2159892 | 3/2010 |
| FR | 2744847 | 8/1997 |

OTHER PUBLICATIONS

T4 Stud Box Mounting Bracket, posted at amazon.com, posting date Sep. 17, 2019, [online], [site visited Jul. 23, 2020]. Available from Internet, URL: https://www.amazon.com/Pack-Mounting-Bracket-Boxes-Studs/dp/B07XZK33NJ (Year: 2020).

* cited by examiner

MOUNTING BRACKET

CROSS-REFERENCE TO RELATED APPLICATIONS

This application claims the benefit of U.S. Provisional Application No. 62/682,524, filed Jun. 8, 2018, and U.S. Provisional Application No. 62/796,287, filed Jan. 24, 2019, the entireties of which are hereby incorporated by reference.

FIELD OF THE DISCLOSURE

The present disclosure generally relates to a mounting bracket, and more particularly to a mounting bracket for mounting an electrical or communication device on a stud of a wall.

BACKGROUND OF THE DISCLOSURE

Typically, an electrical or communication device is installed in a building using a mounting bracket. The electrical or communication device is connected to the mounting bracket, and in turn, the mounting bracket is fastened to framing (e.g., a wall stud) of the building. In some circumstances, junction boxes are used to house and protect electrical and communication devices, such as electrical outlets, electrical switches, associated electrical wiring, communication terminals (e.g., terminals for fiber optics), and associated communication cables (e.g., optical fiber cables). The junction box is secured to the mounting bracket, so that, in turn, the electrical or communication device is secured to the mounting bracket.

SUMMARY OF THE DISCLOSURE

In one aspect, a mounting bracket for mounting a junction box to a stud of a wall comprises a face plate having opposite left and right edge margins. The face plate is configured to attach to the junction box. A stud mounting flange is coupled to one of the left and right edge margin of the face plate and is configured to engage the stud. At least one clamping flange is coupled to the stud mounting flange and is configured to engage the stud. The at least one clamping flange is resiliently deflectable and is configured to apply a force to the stud to hold the mounting bracket on the stud when the mounting bracket is mounted to the stud.

In another aspect, a mounting bracket for mounting a junction box to a stud of a wall comprises a face plate having opposite upper and lower edge margins. The face plate is configured to attach to the junction box. A detachable leg is releasably coupled to a first location on the mounting bracket. The detachable leg is configured to uncouple from the first location of the mounting bracket and couple to the mounting bracket at a second location on the mounting bracket different from the first location.

In another aspect, a mounting bracket for mounting a junction box to a stud of a wall comprises a face plate and a mounting opening formed in the face plate. The mounting opening is configured to receive and hold a fastener at multiple locations within the at least one mounting opening for attaching junction boxes of different sizes in a plurality of different orientations.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Overall, the mounting brackets described herein are used to attach a junction box and/or mud ring to a stud of a wall. Each mounting bracket is configured to be able to support junction boxes of various sizes and various orientations. Each mounting bracket is also able to be temporarily attached to the stud without the use of fasteners. In this manner, an operator, such as a construction worker, does not have to hold the mounting bracket in place on the stud S before securing the mounting bracket thereon and can, therefore, permanently secure the mounting bracket to the stud with both hands and/or without the use of additional tools holding the mounting bracket in place.

Figure 1:
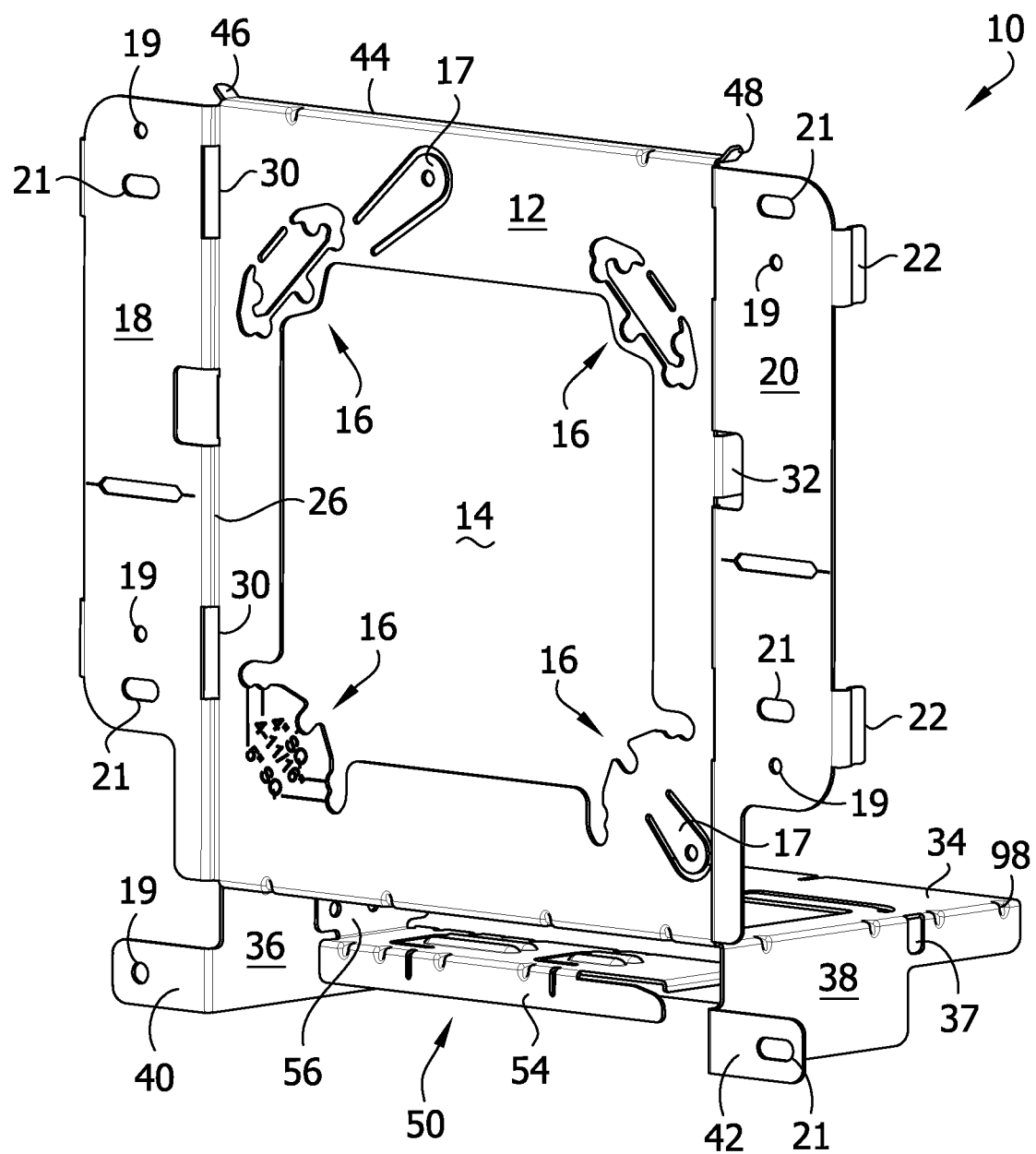
FIG. 1 is a front perspective of one embodiment of a mounting bracket of the present disclosure.
Figure 2:
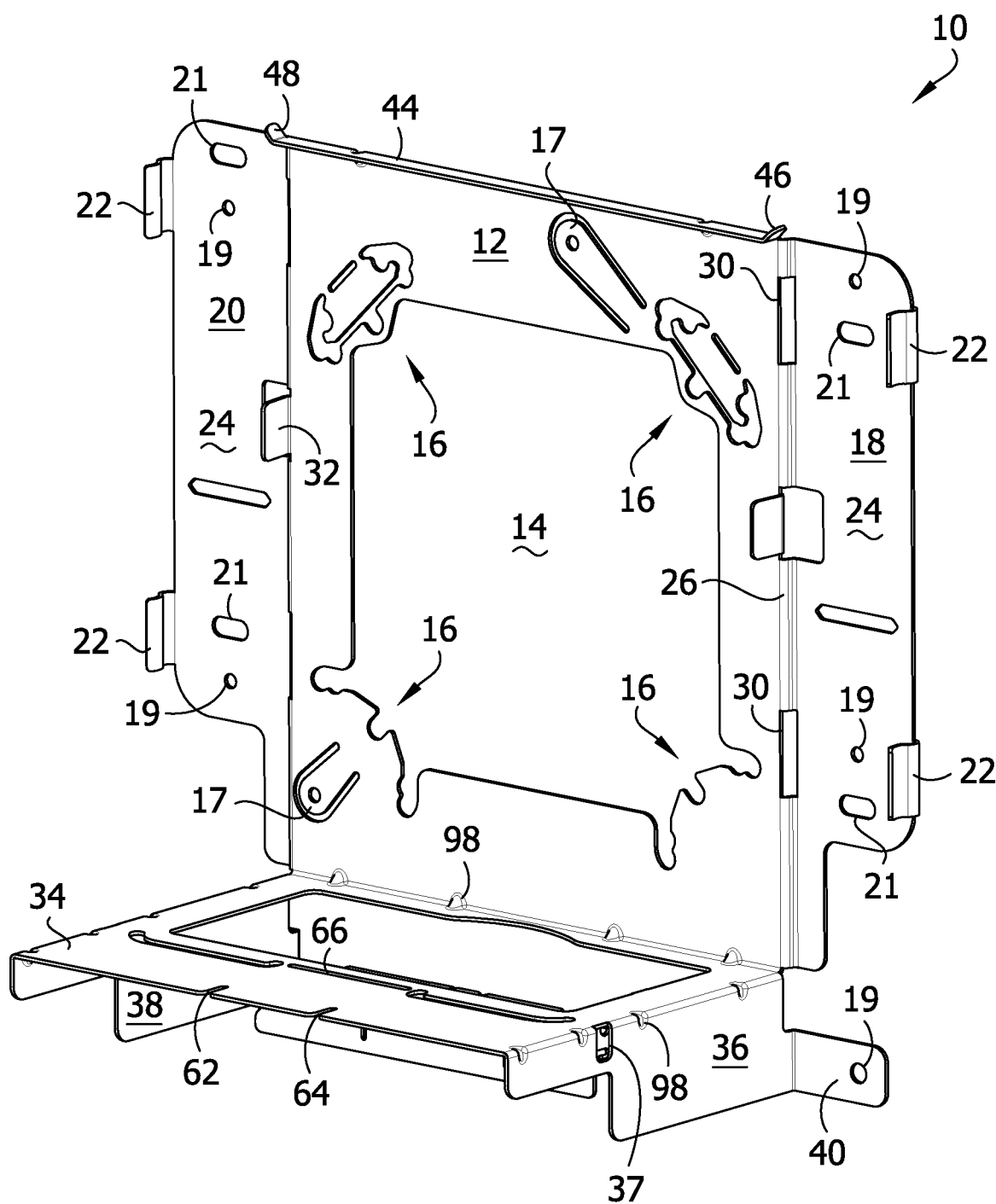
FIG. 2 is a rear perspective of the mounting bracket of FIG. 1.
Figure 3:
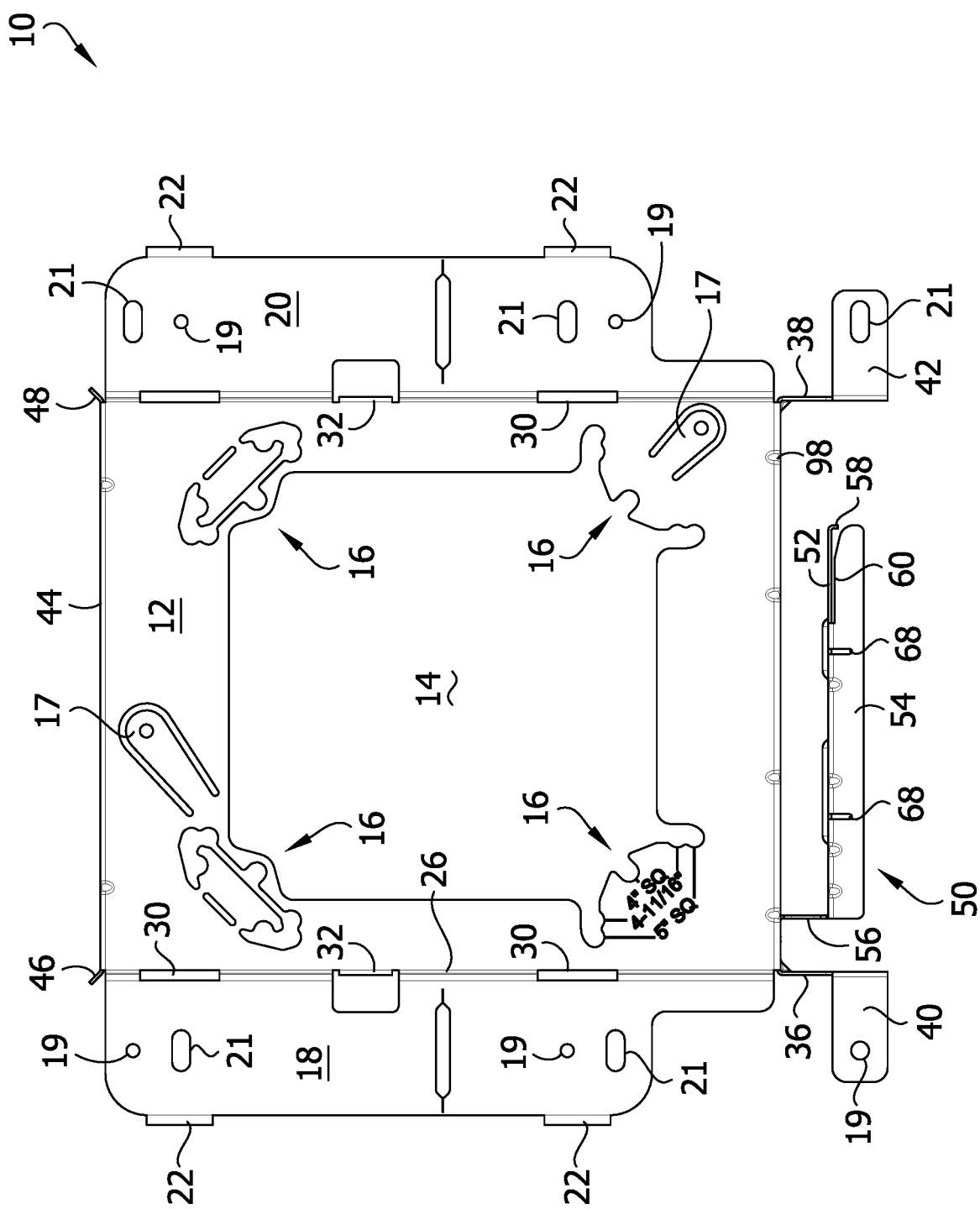
FIG. 3 is a front view of the mounting bracket of FIG. 1.

Referring to FIGS. 1-3 and 13, a mounting bracket for mounting a junction box J (or the like) on a stud S of a wall (e.g., a metal wall stud) is generally indicated at reference numeral 10. The orientation of the mounting bracket 10 in FIGS. 1 and 3 provides the point of reference for the terms defining relative locations and positions of structures and components of the bracket, including but not limited to the terms "upper," "lower," "left," "right," "top," "bottom," "forward," and "rearward," as used throughout the present disclosure.

The mounting bracket 10 includes a face plate 12 that is generally rectangular having opposite upper and lower edge margins, opposite left and right edge margins, a front face, a rear face, and a large, generally rectangular, central opening 14. The central opening 14 is sufficiently large enough to permit use of the mounting bracket 10 with junction boxes J (FIG. 13) of different sizes. When fastened to the face plate 12, as described below, the junction box J is generally accessible through the central opening 14. As an example, the mounting bracket 10 is suitable for use with the junction boxes J having the following known sizes (length of upper and lower sides×length of left and right sides): 4×4 in, 4$^{11}$⁄$_{16}$×4$^{11}$⁄$_{16}$ in, 5×5 in, and 6×6 in.

The mounting bracket 10 includes a plurality of box mounting openings 16 (e.g., mounting openings) defined by the face plate 12 for use in fastening junction boxes J of different sizes to the rear face of the face plate. As explained in more detail below, the box mounting openings 16 are configured to receive and hold a fastener at multiple locations within the mounting opening for attaching junction boxes of different sizes in a plurality of different orientations. For example, the box mounting openings 16 may receive and hold a fastener at multiple locations such as at least two locations, at least three locations, at least five locations or at least seven locations. The box mounting openings 16 are generally positioned at each corner of the generally rectangular central opening 14 and are configured to facilitate the connection of a junction box J to the mounting bracket 10. For example, some of the openings in each mounting opening are configured to receive fasteners (e.g., screws) to attach the junction box J to the mounting bracket 10. The configuration of the box mounting openings 16 allows the mounting bracket 10 to connect to junction boxes J of different sizes such as junction boxes having the following sizes: 4×4 in, 4$^{11}$⁄$_{16}$×4$^{11}$⁄$_{16}$ in, and 5×5 in. Other sizes are within the scope of the present disclosure. Moreover, the configuration of the box mounting openings 16 allows junction boxes J to be attached in different orientations (e.g., rotated 90°, 180°, 270°) around the central opening 14. Each box mounting opening 16 may also include one or more plaster ring mounting tabs 17 for use in attaching a plaster ring PR (e.g., mud ring) (FIGS. 13-18) to the mounting bracket 10 without using the junction box J. Further details of plaster ring mounting tabs 17 and how they are used to attach to a plaster ring PR may be found in U.S. Pat. No. 9,444,236, hereby incorporated by reference in its entirety.

Figure 5:
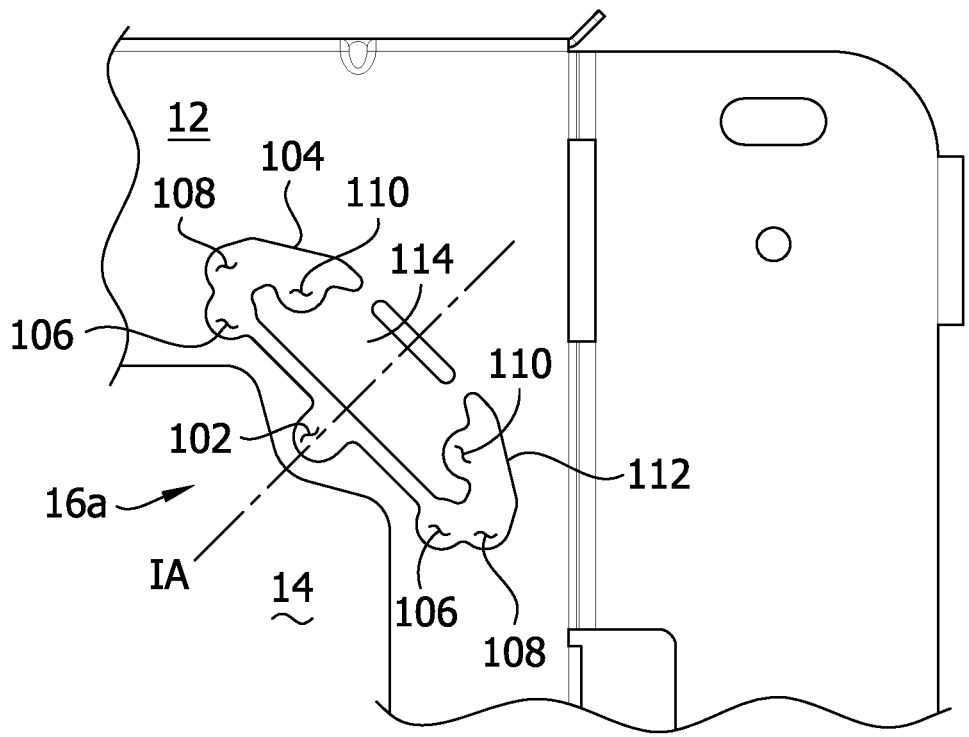
FIG. 5 is an enlarged fragmentary view of FIG. 3.
Figure 6:
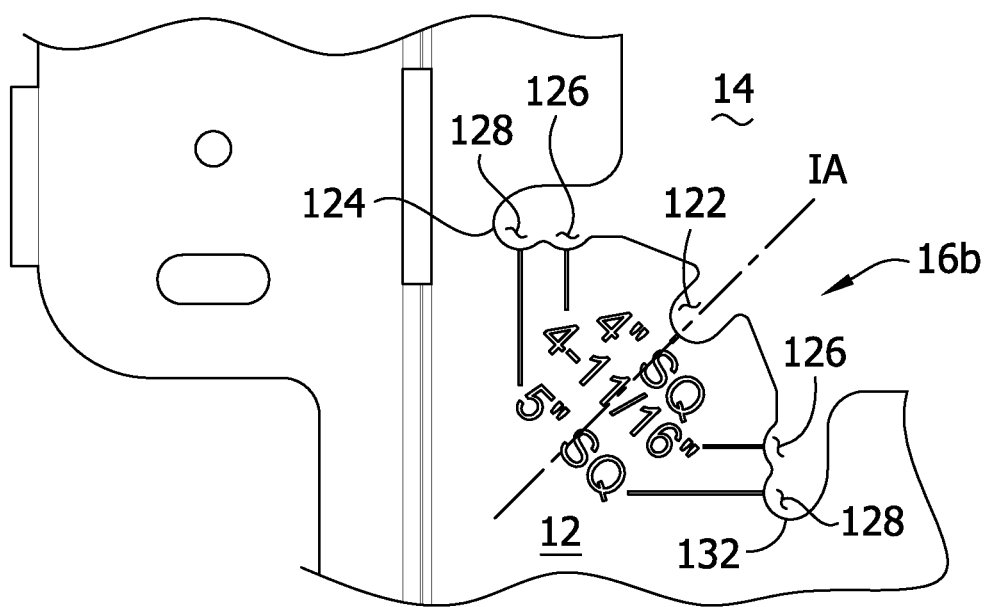
FIG. 6 is an enlarged fragmentary view of FIG. 3.

Referring to FIGS. 3, 5 and 6, in one embodiment, the box mounting openings 16 of the mounting bracket 10 are comprised of a first box mounting opening type 16a (FIG. 5) and a second box mounting opening type 16b (FIG. 6). The mounting bracket 10 includes two of each first and second box mounting opening type 16a, 16b. In the illustrated embodiment, the upper two box mounting openings 16 are of the first box mounting opening type 16a and the lower two box mounting openings are of the second box mounting opening type 16b, although other positions of the first and second box mounting opening types are within the scope of the present disclosure. The first and second box mounting opening types 16a, 16b (broadly, at least one box mounting opening type or box mounting opening) are configured to receive a fastener in a plurality of different locations on the face plate 12 (broadly, mounting bracket 10) to enable junction boxes J of different sizes to be attached to the mounting bracket 10 and to enable junction boxes to be attached to the mounting bracket in different orientations (e.g., vertical, horizontal).

Referring to FIG. 5, the first box mounting opening type 16a includes a first fastener opening 102 that receives the fastener that connects the junction box J to the mounting bracket 10 at one location. The first fastener opening 102 is aligned (e.g., disposed on) an imaginary axis IA that extends through the corner defined by two adjacent sides of the generally rectangular central opening 14. The imaginary axis IA extends at a 45 degree angle relative to each of the two adjacent sides. The first fastener opening 102 is sized and shaped to receive a single fastener at one location on the face plate 12. The first box mounting opening type 16a also includes a second fastener opening 104. The second fastener opening 104 is configured to receive the fastener at three different locations. The second fastener opening 104 includes a first section 106 that receives the fastener at one location, a second section 108 that receives the fastener at another location and a third section 110 that receives the fastener at yet another location on the face plate 12. The first box mounting opening type 16a also includes a third fastener opening 112. The third fastener opening 112 is a mirror image of the second fastener opening 104 relative to the imaginary axis IA. Thus, the third fastener opening 112 includes a first section 106 that receives the fastener at one location, a second section 108 that receives the fastener at another location and a third section 110 that receives the fastener at yet another location. Accordingly, the first box mounting opening type 16a can receive the fastener at seven different locations (broadly, at least seven different locations). More or fewer locations are within the scope of the present disclosure. Each location is defined by a fastener opening, or portion thereof. In this embodiment, the first, second and third fastener openings 102, 104, 112 are not continuous with the central opening 14.

As shown in FIG. 5, the first box mounting opening type 16a is symmetrical relative to the imaginary axis IA. The second and third fastener openings 104, 112 are mirror images of each other so that the first box mounting opening type 16a can be used with certain size junction boxes J, regardless of the junction box's orientation. For example, in one embodiment, the first fastener opening 102 receives the fastener to connect the mounting bracket 10 to (e.g., is used for) a 4×4 in size junction box J in any orientation; the first section 106 of the second fastener opening 104 is used for a 4¹¹⁄₁₆×4¹¹⁄₁₆ in size junction box in one orientation (e.g., a vertical orientation); the first section 126 of the third fastener opening 112 is used for the 4¹¹⁄₁₆×4¹¹⁄₁₆ in size junction box in another orientation (e.g., a horizontal orientation); the second section 108 of the second fastener opening 104 is used for a first type of 5×5 in size junction box in one orientation (e.g., vertical orientation); the second section 128 of the third fastener opening 112 is used for the first type of 5×5 in size junction box in another orientation (e.g., horizontal orientation); the third section 110 of the second fastener opening 104 is used for a second type of 5×5 in size junction box in one orientation (e.g., vertical orientation); and the third section 110 of the third fastener opening 112 is used for the second type of 5×5 in size junction box in another orientation (e.g., horizontal orientation). It is understood the relative positions of the first, second and third fastener openings 102, 104, 112 (and sections thereof) on the face plate 12 will depend upon the configuration of the junction box(es) the mounting bracket 10 supports. Accordingly, it is understood that one or more of the first, second and third fastener openings 102, 104, 112 (and sections thereof) may have other positions on the face plate 12 to accommodate junction box(es) of other sizes and configurations. Other configurations of the second and third fastener openings 104, 112 are within the scope of the present disclosure. For example, the first, second and third sections may be separate, discrete openings in the face plate 12 instead of portions of a single opening.

The edge of the face plate 12 that defines the second and third fastener openings 104, 112 also defines at least a portion of each section 106, 108, 110. This way, when a fastener is inserted into one of the sections 106, 108, 110, the edge of the face plate 12 holds the fastener in position in that section and prevents the fastener from moving into another section of the fastener opening 104, 112. This also helps keep the junction box J positioned and centered over the central opening 14. As shown in FIG. 5, a portion of each section 106, 108, 110 is defined by a portion of the edge of the face plate 12 that has a partial circular shape (e.g., not a complete circle) to receive the fastener and prevent the fastener from moving within the fastener opening 104, 112.

The first box mounting opening type 16a may also include a locking tab 114 that at least partially defines the first, second and third fastener openings 102, 104, 112. The locking tab 114 is connected to and integral with the face plate 12 and is generally coplanar with the face plate. The locking tab 114 is configured to permit the head of a fastener to pass through the first, second and third fastener openings 102, 104, 112, to more easily attach the junction box to the mounting bracket 10. The locking tab 114 is deflectable such that the locking tab may be deflected (e.g., bent) out of plane with the face plate 12. In one method of use, a user attaches the fastener to the junction box J and then pushes the head of the fastener through the selected fastener opening 102, 104, 112. As the head is pushed into the fastener opening 102, 104, 112, the head deflects the locking tab 114 out of plane with the face plate 12 to create the necessary space to permit the head to pass through the corresponding fastener opening. After the locking tab 114 is sufficiently deflected and the head was able to pass through the fastener opening 102, 104, 112, the locking tab is moved back to its pre-deflected position by manually pushing the locking tab or tightening the fastener, securing the fastener in the fastener opening 102, 104, 112. In the illustrated embodiment, the locking tab 114 is connected to the face plate 12 with two bendable links (broadly, at least one bendable link) that permit the deflection and bending of the locking tab.

Referring to FIG. 6, the second box mounting opening type 16b includes a first fastener opening 122 that receives the fastener that connects the junction box J to the mounting bracket 10 at one location on the face plate 12. The first fastener opening 122 is aligned (e.g., disposed on) an imaginary axis IA that extends through the corner defined by two adjacent sides of the generally rectangular central opening 14. The imaginary axis IA extends at a 45 degree angle relative to each of the two adjacent sides. The first fastener opening 122 is sized and shaped to receive a single fastener at one location. The second box mounting opening type 16b also includes a second fastener opening 124. The second fastener opening 124 is configured to receive the fastener at two different locations on the face plate 12. The second fastener opening 124 includes a first section 126 that receives the fastener at one location and a second section 128 that receives the fastener at another location. The second box mounting opening type 16b also includes a third fastener opening 132. The third fastener opening 132 is a mirror image of the second fastener opening 124 relative to the imaginary axis IA. Thus, the third fastener opening 132 includes a first section 126 that receives the fastener at one location and a second section 128 that receives the fastener at another location on the face plate 12. Accordingly, the second box mounting opening type 16b can receive the fastener at five different locations on the face plate 12 (broadly, at least five different locations). More or fewer locations are within the scope of the present disclosure. Each location is defined by a fastener opening, or portion thereof. In this embodiment, the first, second and third fastener openings 122, 126, 128 are continuous with the central opening 14.

As shown in FIG. 6, the second box mounting opening type 16b is symmetrical relative to the imaginary axis IA. The second and third fastener openings 124, 132 are mirror images of each other so that the second box mounting opening type 16b can be used with certain size junction boxes J, regardless of the junction box's orientation. For example, in one embodiment, the first fastener opening 122 receives the fastener to connect the mounting bracket 10 to (e.g., is used for) the 4×4 in size junction box J in any orientation; the first section 126 of the second fastener opening 124 is used for the 4¹¹⁄₁₆×4¹¹⁄₁₆ in size junction box in one orientation (e.g., a vertical orientation); the first section 126 of the third fastener opening 132 is used for the 4¹¹⁄₁₆×4¹¹⁄₁₆ in size junction box in another orientation (e.g., a horizontal orientation); the second section 128 of the second fastener opening 124 is used for either the first or second type of 5×5 in size junction box in one orientation (e.g., vertical orientation); and the second section 128 of the third fastener opening 132 is used for either the first or second type of 5×5 in size junction box in another orientation (e.g., horizontal orientation). Accordingly, it is appreciated that when a fastener is received in the first fastener opening 102 of the first box mounting opening type 16a to attach a 4×4 in size junction box J to the mounting bracket 10, a fastener is also received in the first fastener opening 122 of the second box mounting opening type 16b. The same occurs for the second and third fastener openings 104, 124, 112, 132 and sections thereof 106, 108, 110, 128, 126 of the first and second box mounting types 16a, 16b for junction boxes J of other sizes. In one embodiment, indicia may be provided to identify which fastener openings and sections thereof are used for different size junction boxes J. As mentioned above, it is understood the relative positions of the first, second and third fastener openings 122, 124, 132 (and sections thereof) on the face plate 12 will depend upon the configuration of the junction box(es) the mounting bracket 10 supports. Accordingly, it is understood that one or more of the first, second and third fastener openings 122, 124, 132 (and sections thereof) may have other positions on the face plate 12 to accommodate junction box(es) of other sizes and configurations. Other configurations of the second and third fastener openings 124, 132 are within the scope of the present disclosure. For example, the first and second sections may be separate, discrete openings in the face plate 12 instead of portions of a single opening.

The edge of the face plate 12 that defines the second and third fastener openings 124, 132 also defines at least a portion of each section 126, 128. This way, when a fastener is inserted into one of the sections 126, 128, the edge of the face plate 12 holds the fastener in position in that section and prevents the fastener from moving into another section of the fastener opening 124, 132. This also helps keep the junction box J positioned and centered over the central opening 14. As shown in FIG. 6, a portion of each section 126, 128 is defined by a portion of the edge of the face plate 12 that has a partial circular shape (e.g., not a complete circle) to receive the fastener and prevent the fastener from moving within the fastener opening 124, 132.

Referring back to FIGS. 1-3, the mounting bracket 10 includes a pair of left and right stud mounting flanges 18 and 20, respectively, coupled to the face place 12. The left and right stud mounting flanges 18, 20 extend laterally outward from the left and right edge margins, respectively, of the face plate 12. In general, these stud mounting flanges 18, 20 are used to secure the mounting bracket 10 to a stud S (FIG. 13) of a wall. The stud mounting flanges 18, 20 are generally planar and are configured to overly and engage a side surface of the stud S. The stud mounting flanges 18, 20 are co-planar with one another and are generally parallel to the face plate 12. The stud mounting flanges 18, 20 define fastener openings therein to receive fasteners 15 (e.g., self-tapping sheet metal screws) (FIG. 13-18) to secure the mounting bracket 10 to the stud S. The fastener openings are also disposed on the left and right stud mounting flanges 18, 20 so that corresponding fastener openings of two mounting brackets 10 arranged in an overlapping, side-by-side arrangement align with one another and can receive the fastener 15 therein.

In the illustrated embodiment, the left and right stud mounting flanges 18, 20 each define two types of fastener openings, a circular fastener opening 19 and a slot fastener opening 21. The circular fastener openings 19 and slot fastener openings 21 are positioned along the mid-line of each stud mounting flange 18, 20. The fastener openings are arranged in sets, one circular fastener opening 19 and one slot fastener opening 21 positioned either above or below the one circular fastener opening along the mid-line. In the illustrated embodiment, the left and right stud mounting flanges 18, 20 each include an upper and lower set of circular and slot fastener openings 19, 21. Each set of fastener openings 19, 21 on the stud mounting flanges 18, 20 is arranged in an orientation that is the opposite of the arrangement of the corresponding set of fastener openings on the other stud mounting flange. As shown in FIG. 3, the slot fastener opening 21 is disposed above the circular fastener opening 19 in the upper set of fastener openings defined by the right stud mounting flange 20 and the corresponding upper set of the fastener openings defined by the left stud mounting flange 18 is arranged such that the slot fastener opening is disposed below the circular fastener opening 19. This arrangement results in each circular fastener opening 19 on a stud mounting flange 18, 20 aligning with a slot fastener opening 21 on a stud mounting flange of a second, identical mounting bracket (and vice versa) when the second mounting bracket is in an overlapping, side-by-side arrangement with mounting bracket 10 (FIG. 16), as described in more detail below. Aligning a circular fastener opening 19 with a slot fastener opening 21 ensures corresponding fastener openings align with each other in the field. Further details of the fastener openings may be found in U.S. Pat. No. 9,444,236, hereby incorporated by reference in its entirety.

The left and right stud mounting flanges 18, 20 are coupled (e.g., connected) to the face plate 12 by left and right intermediate flanges 26 and 28, respectively (FIG. 3). The intermediate flanges 26, 28 are generally perpendicular to the face plate 12 and stud mounting flanges 18, 20 and offset the stud mounting flanges from the face plate, in a forward direction, such that the stud mounting flanges lie in a different plane than the face plate.

Figure 4:
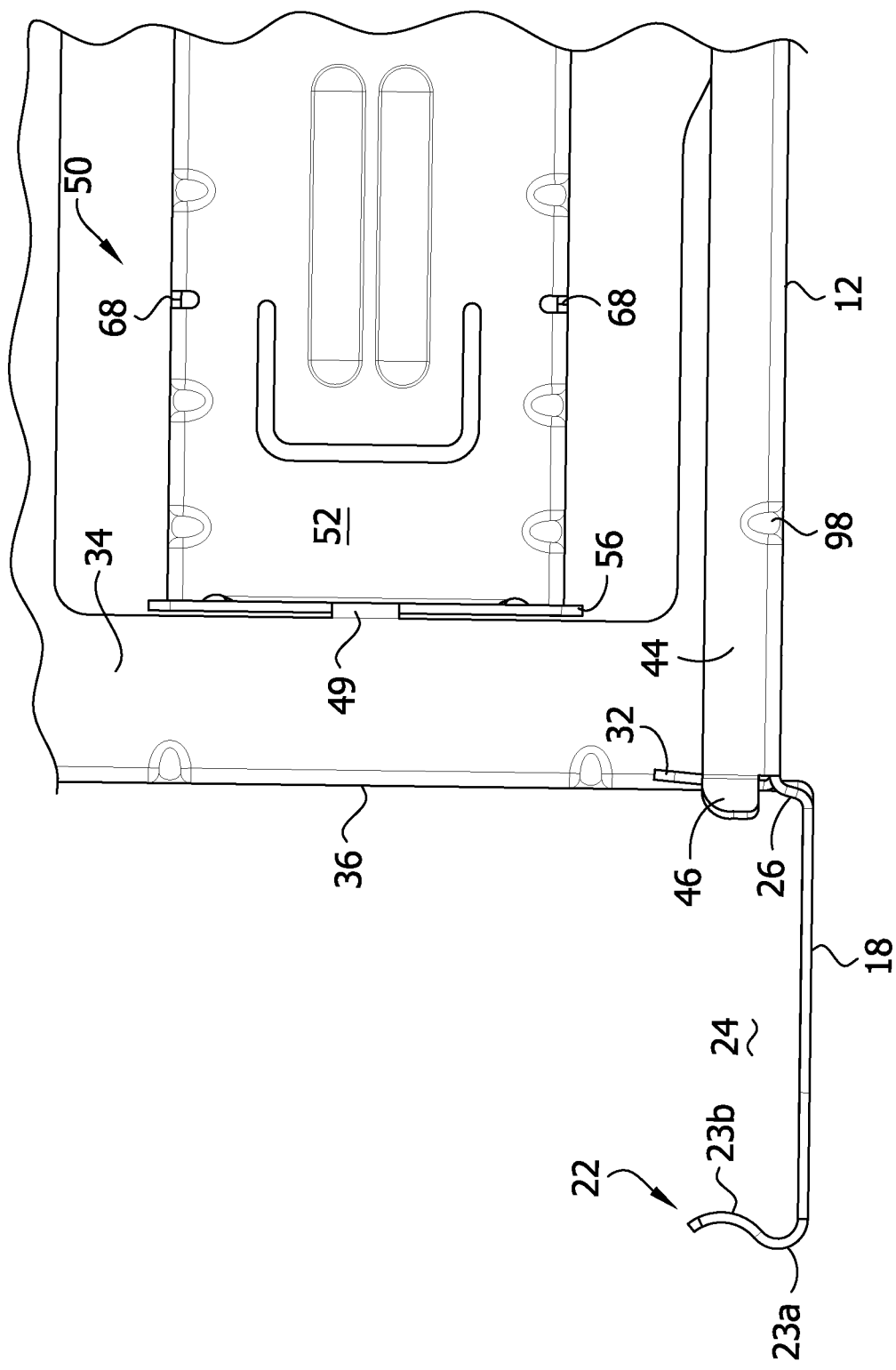
FIG. 4 is an enlarged fragmentary top view of the mounting bracket of FIG. 1.

The mounting bracket 10 includes at least one clamping flange 22 coupled to the left and right stud mounting flanges 18, 20 and configured to engage the stud S of the wall. Each clamping flange 22 is resiliently deflectable and is configured to apply a force to the stud S to hold the mounting bracket 10 on the stud when the mounting bracket is mounted on the stud. In the illustrated embodiment, the mounting bracket 10 includes upper and lower clamping flanges 22 extending generally perpendicularly rearward from an outer left edge margin of the left stud mounting flange 18. Similarly, the mounting bracket 10 includes upper and lower clamping flanges 22 extending generally perpendicularly reward from an outer right edge margin of the right stud mounting flange 20. As shown in FIG. 4, each clamping flange 22 includes first and second curved segments 23a and 23b, respectively (broadly, at least one curved segment). The first curved segment 23a extends from the outer edge margin of one of the stud mounting flanges 18, 20 and curves inward toward the face plate 12 (e.g., the first curved segment is concave when viewed from a position adjacent the face plate). The first curved segment 23*a* has a first radius of curvature. The second curved segment 23*b* extends from the first curved segment 23*a* to a free end and curves outward away from the face plate 12 (e.g., the second curved segment is convex when viewed form a position adjacent the face plate). The second curved segment 23*b* is configured to engage the stud S. One or both of the first and second curved segments 23*a*, 23*b* can be resiliently deflectable. The second curved segment 23*b* has a second radius of curvature. Preferably, the second radius of curvature is larger than the first radius of curvature. In the illustrated embodiment, the ratio of the second radius of curvature to the first radius of curvature is 2:1. However, the radius of curvatures could have other ratios without departing from the scope of the disclosure. For example, the ratio of the second radius of curvature to the first radius of curvature could be in a range between about 1:1 to about 3:1. Other configurations of the clamping flanges 22 are also within the scope of the present disclosure.

Together, at least the upper and lower clamping flanges 22, stud mounting flanges 18, 20 and intermediate flanges 26, 28 on each side of the mounting bracket 10 defined a stud receiving space 24 on each side of the mounting bracket (FIGS. 2 and 4). The stud receiving space 24 is configured (e.g., sized and shaped) to receive the stud therein to connect the mounting bracket 10 to the stud. The upper and lower clamping flanges 22 temporary hold and mount the mounting bracket 10 on the stud S when the stud is inserted into the stud receiving space 24. In addition, the mounting bracket 10 may also include opposite left and right support tabs 32 extending reward from the left and right edge margins, respectively, of the face plate 12. Each support tab 32 defines a portion of the stud receiving space 24 and is configured to engage the stud S to provide additional support when the mounting bracket 10 is attached to the stud. The support tabs 32 are disposed on one side of the stud receiving space 24 and the clamping flanges 22 are disposed on the other side of the stud receiving space so that when the stud S is inserted into the stud receiving space, the stud is disposed between the clamping flanges and the support tab. In other embodiments, each side of the mounting bracket 10 may include more than one support tab 32.

The mounting bracket 10 includes at least one slot 30 (e.g., gaps, openings) configured (e.g., sized and shaped) to receive a clamping flange 22 of a second mounting bracket 10' (FIG. 16) when the mounting bracket 10 and second mounting bracket are attached to one another in an overlapping, side-by-side arrangement, as described in more detail below. Each slot 30 is defined, at least in part, by the face plate 12 and one of the stud mounting flanges 18, 20. In the illustrated embodiment, the mounting bracket 10 includes a plurality slots 30, each slot defined by the face plate 12, one of the intermediate flanges 26, 28 and one of the stud mounting flanges 18, 20. The illustrated embodiment includes four slots 30 with two slots (e.g., upper and lower slots) arranged on each side of the face plate 12 (broadly, each side of the mounting bracket 10) so that a second mounting bracket 10' can be attached to either side of mounting bracket 10. The two upper and lower slots 30 on either side of the mounting bracket 10 are sized and shaped to receive the upper and lower clamping flanges 22, respectively, coupled to one of the stud mounting flanges 18, 20 of a second mounting bracket 10'. The intermediate flanges 26, 28 define upper and lower bounds of the slots 30. In other embodiments, the intermediate flanges 26, 28 may not define one of the upper and lower bounds of the slots 30 such that the slots have one of an open (e.g., unbounded) upper or lower end. The illustrated intermediate flanges 26, 28 are composed of several (broadly, two or more) sections. Other configurations and arrangements of the slots 30 are within the scope of the present disclosure.

The mounting bracket 10 may also include a base flange 34 extending reward from the lower edge margin of the face plate 12, opposite left and right side flanges 36, 38 extending downward from left and right edge margins of the base flange, and left and right front connection tabs 40, 42 extending outward (e.g., away from each other) from each front edge margin of the left and right side flanges. The base flange 34 is generally perpendicular the face plate 12, the side flanges 36, 38 are generally perpendicular to the base flange, and the front connection tabs 40, 42 are generally perpendicular to the side flanges. In the preferred embodiment, the base flange 34 extends a distance from the face plate 12 that is equal to the depth of the stud S (e.g., stud wall) so that the rear-most edge margin of base flange engages the inside of the opposite face of the wall (e.g., drywall) to provide additional support for the mounting bracket when secured to the stud S. Each side flange 36, 38 defines a portion of the stud receiving space 24 on each side of the mounting bracket 10 and is configured to engage the stud S to provide additional support when the mounting bracket is attached to the stud.

The left and right front connection tabs 40, 42 are coplanar with the left and right stud mounting flanges 18, 20, respectively. Each front connection tab 40, 42 defines a portion of the stud receiving space 24 on each side of the mounting bracket 10 and is configured to engage the stud S to provide additional support when the mounting bracket is attached to the stud. The front connection tabs 40, 42 define fastener openings configured to receive fasteners 15 (e.g., self-tapping sheet metal screws) to secure the mounting bracket 10 to the stud S. The fastener openings are aligned with the mid-line of the stud mounting flanges 18, 20 and, thus, the fastener openings 19, 21 defined by the stud mounting flanges. In the illustrated embodiment, the fastener opening defined by each front connection tab 40, 42 is either a slot fastener opening 21 or a circular fastener opening 19 and the fastener opening is configured to align with another fastener opening on a front connection tab of a second mounting bracket 10', as described above.

Figure 12:
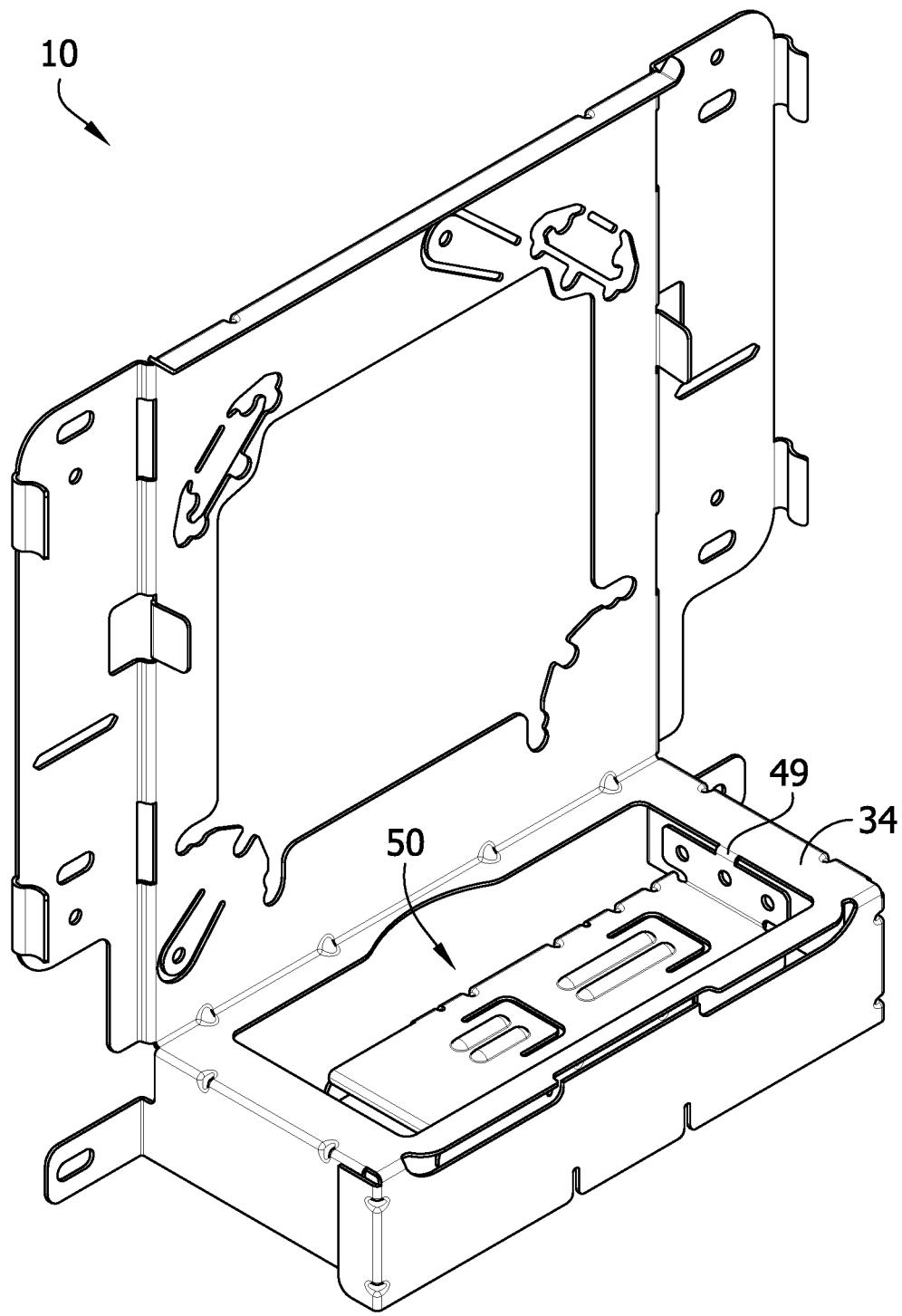
FIG. 12 is a rear perspective of the mounting bracket of FIG. 1 with the length of a base flange of the mounting bracket adjusted.

Referring to FIGS. 1, 2 and 12, in one embodiment the base flange 34 is configured to have an adjustable length (e.g., distance between the face plate 12 and the rear most point of the base flange) in order to allow the base flange to conform to the depth of the stud S to which the mounting bracket 10 is being secured. In particular, the length of the base flange 34 can be reduced so that the mounting bracket 10 can be used with studs S of smaller depth while still having the rear-most point of the mounting bracket 10 (a point on the base flange) engage the inside of the opposite face of the wall (e.g., reduce the overall mounting bracket depth). This provides additional support for the mounting bracket 10 when secured to the smaller stud S and prevents the mounting bracket from moving (e.g., bending) in a rearward direction. For example, if the mounting bracket 10 is being attached to a 2.5 in deep stud S but the base flange 34 has a length (e.g., unadjusted length) that allows the base flange to engage the inside of the opposite face of the wall for a stud S that is 3.5 in deep with the face plate 12 oriented vertically, the length of the base flange can be reduced so that the base flange can fit with the 2.5 in deep stud and still engage the inside of the opposite face of the wall, with the face plate oriented vertically. Other dimensions are within the scope of the present disclosure.

In the illustrated embodiment, the side flange 36, 38 each define a pair of guide slots 37. Each guide slot 37 extends downward from the base flange 34 toward the bottom edge margin of each side flange 36, 38. The guide slots 37 are directly across from one another (e.g., an imaginary line extending between the guide slots is generally parallel to the face plate 12). The guide slots 37 are disposed forward of the rear edge margin of the base flange 34. In the illustrated embodiment, the guide slots 37 are disposed on the side flanges 36, 38 so that the base flange 34 can be shortened to fit a stud S having a 2.5 in depth. The guide slots 37 may be disposed at any position along the side flanges 36, 38 to shorten the base flange 34 to any desired length. The pair of guide slots 37 indicate a cutting location on the side flanges 36, 38 in order to change the length of the base flange 34 (and the side flanges 36, 38) (e.g., the overall depth of the mounting bracket 10). To change the length of the base flange 34, an operator cuts the side flanges 36, 38 at the guide slots 37 to divide each side flange into two separate parts (e.g., front and rear parts). With reference to FIGS. 1 and 2, the cuts are made generally vertically on the side flanges 36, 38, and generally transverse to the length of the base flange 34 and side flange 36, 38. The cut can be made with any suitable tool.

Figure 8:
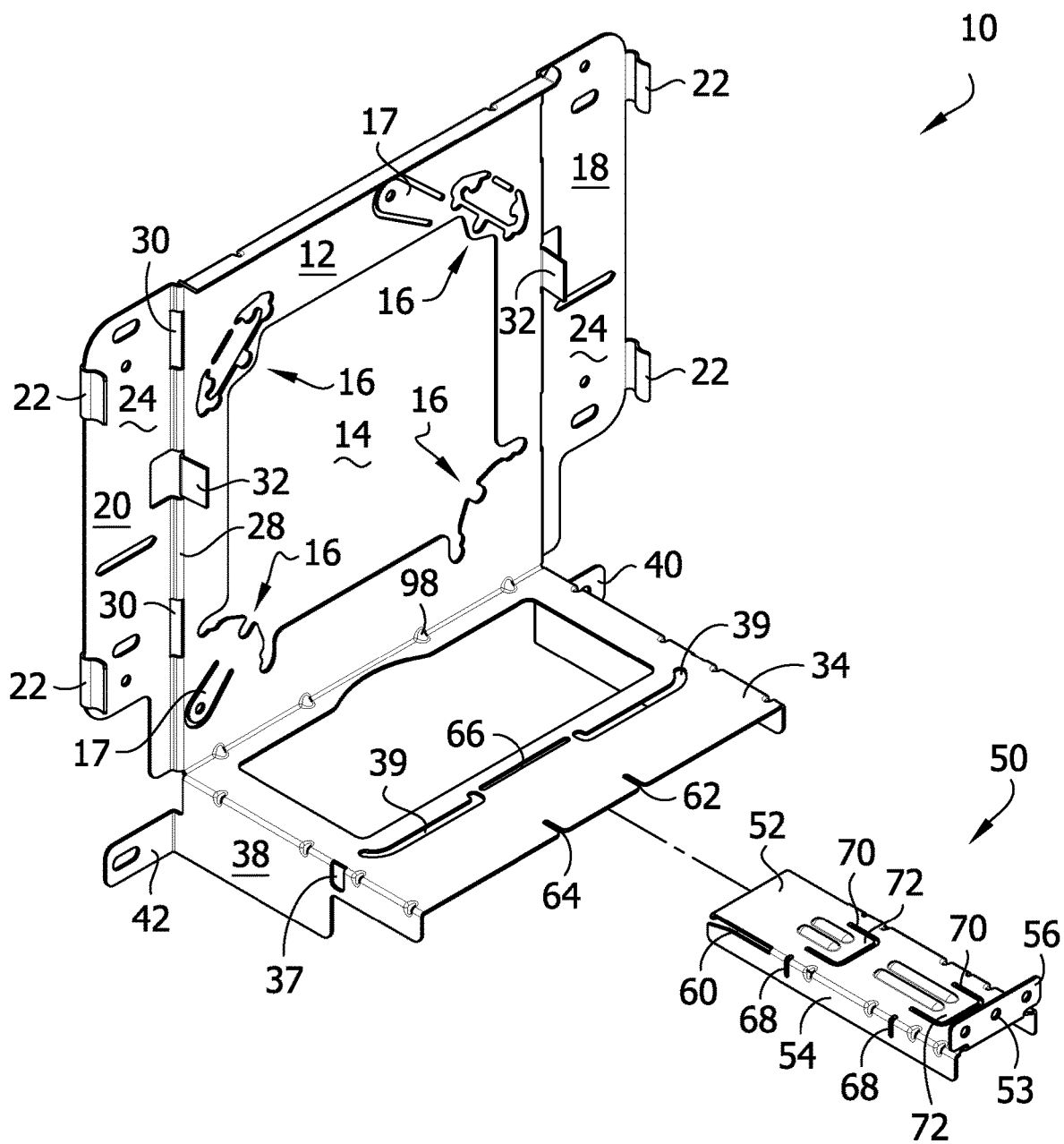
FIG. 8 is an exploded view of the mounting bracket of FIG. 1 showing the detachable leg removed from a first re-coupling location on the mounting bracket.

As shown in FIG. 12, after the side flanges 36, 38 have been cut, the rear portion of the base flange 34 is bent downward to shorten the length of the base flange. The rear portion of the base flange 34 is bent approximately 90° such that the rear portion of the base flange 34 is generally perpendicular to the front portion of the base flange. The rear parts of the side flanges 36, 38 may be further bent as desired to permit the rear portion of the base flange 34 to bend downward (e.g., prevent the front and rear parts of the side flanges from interfering with the bending of the base flange). As shown in FIG. 8, the base flange 34 includes one or more relief slots 39 configured to facilitate the bending of the base flange 34. The one or more relief slots 39 are disposed between the guide slots 37 and create points of weakens in the base flange 34 to enable the base flange to be manually bent by the operator (e.g., the relief slots separate the front and rear portions of the base flange) after the cuts are made. Slot 66, described in more detail below, also acts as a relief slot. In the bent arrangement, the rear portion of the base flange 34 engages the inside of the opposite face wall to provide additional support for the mounting bracket. Moreover, the relief slots 39 may be configured such that at least a portion of the rear most edge margin of the front portion of the base flange 34 also engage the inside of the opposite face wall.

The mounting bracket 10 may also include a top flange 44 extending reward from the top edge margin of the face plate 12 with opposite ears 46, 48 extending from left and right side edge margins of the top flange. The top flange 44 is generally perpendicular to the face plate 12. Each ear 46, 48 extends above the stud receiving space 24 and is resiliently deflectable such that the ears can deflect upon engagement by the stud S.

Figure 13:
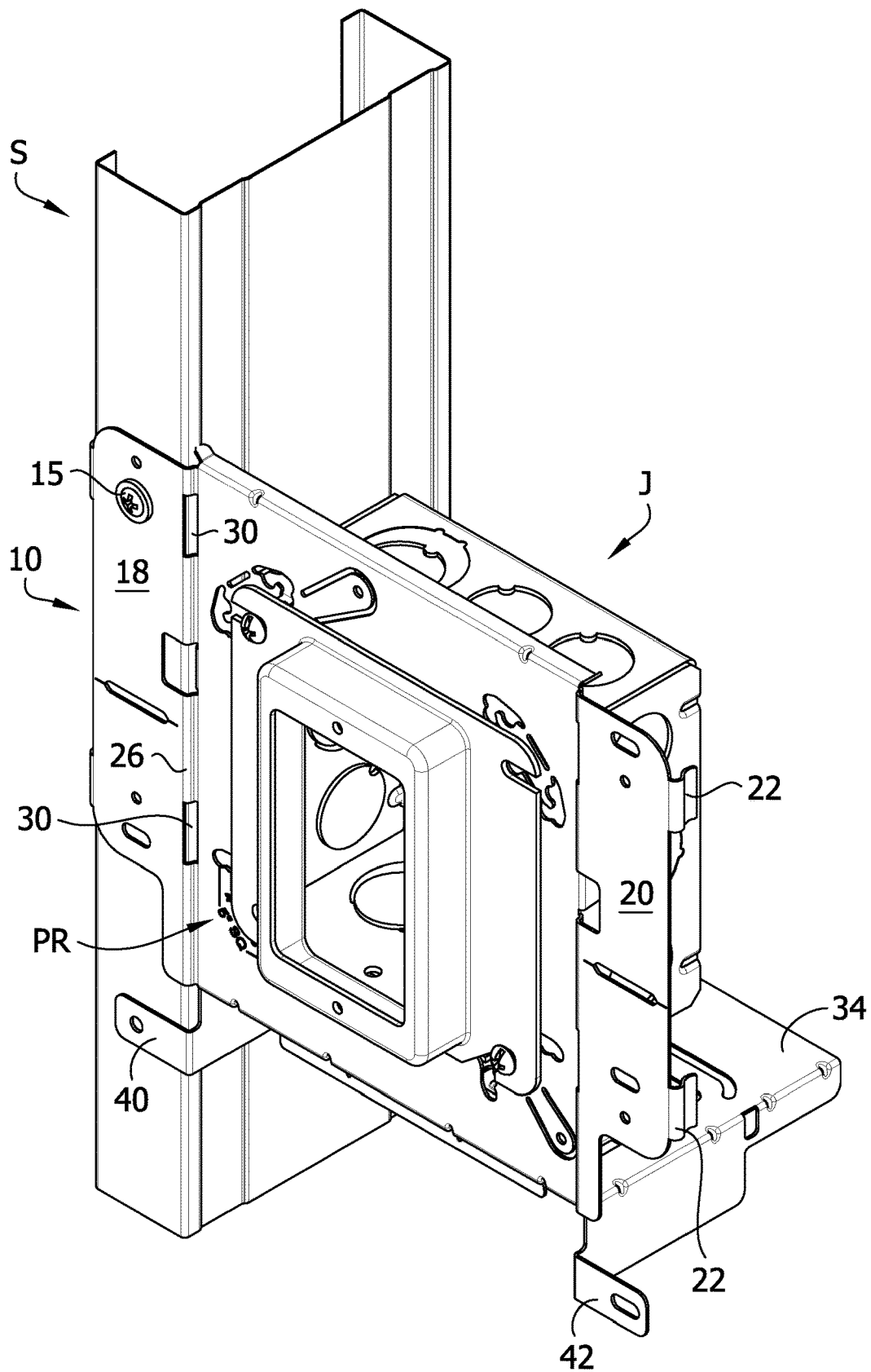
FIG. 13 is a perspective of the mounting bracket of FIG. 1 attached to a stud with the detachable leg attached to the mounting bracket at a first location.
Figure 14:
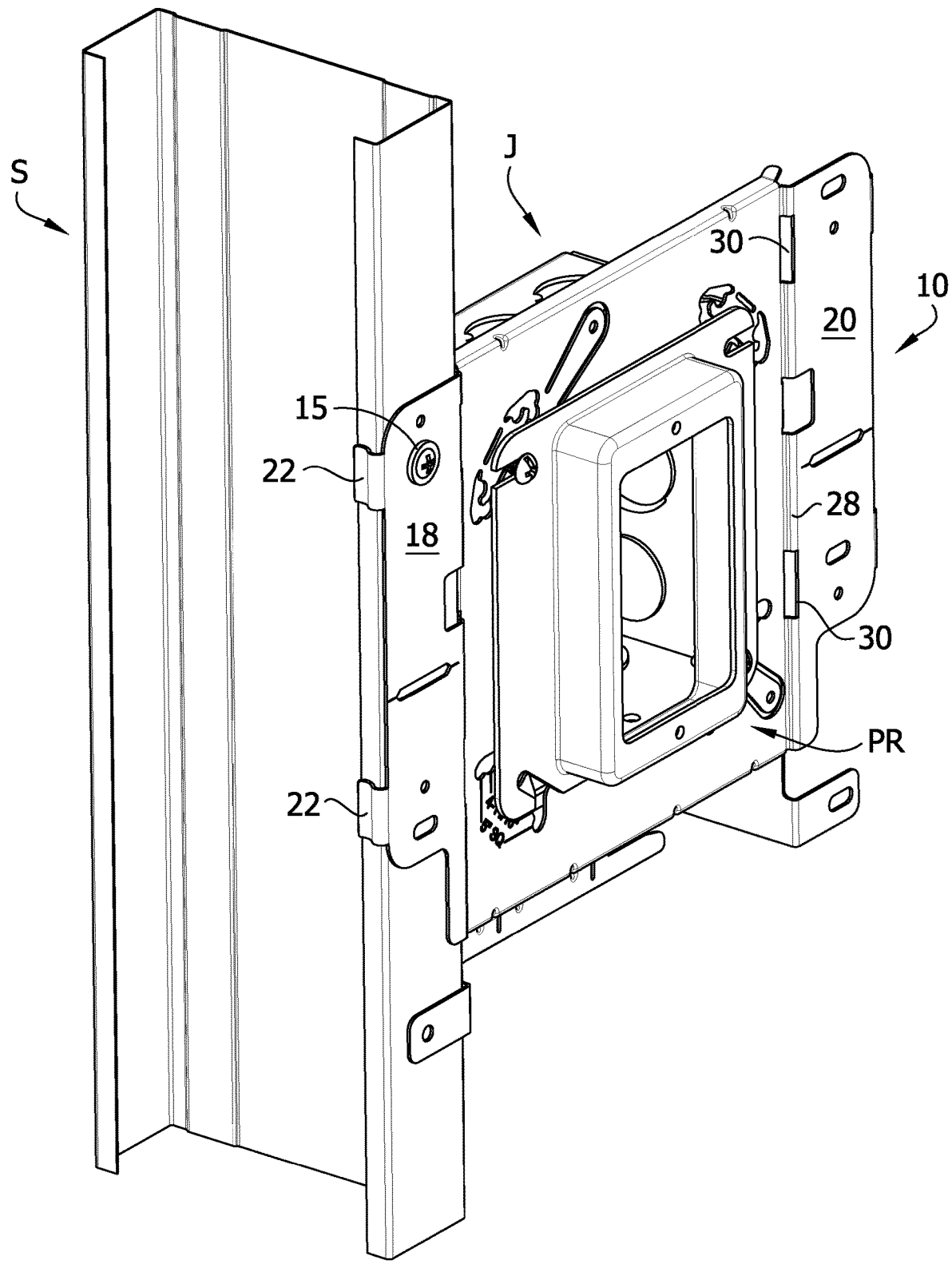
FIG. 14 is another perspective of the mounting bracket of FIG. 1 attached to the stud.
Figure 15:
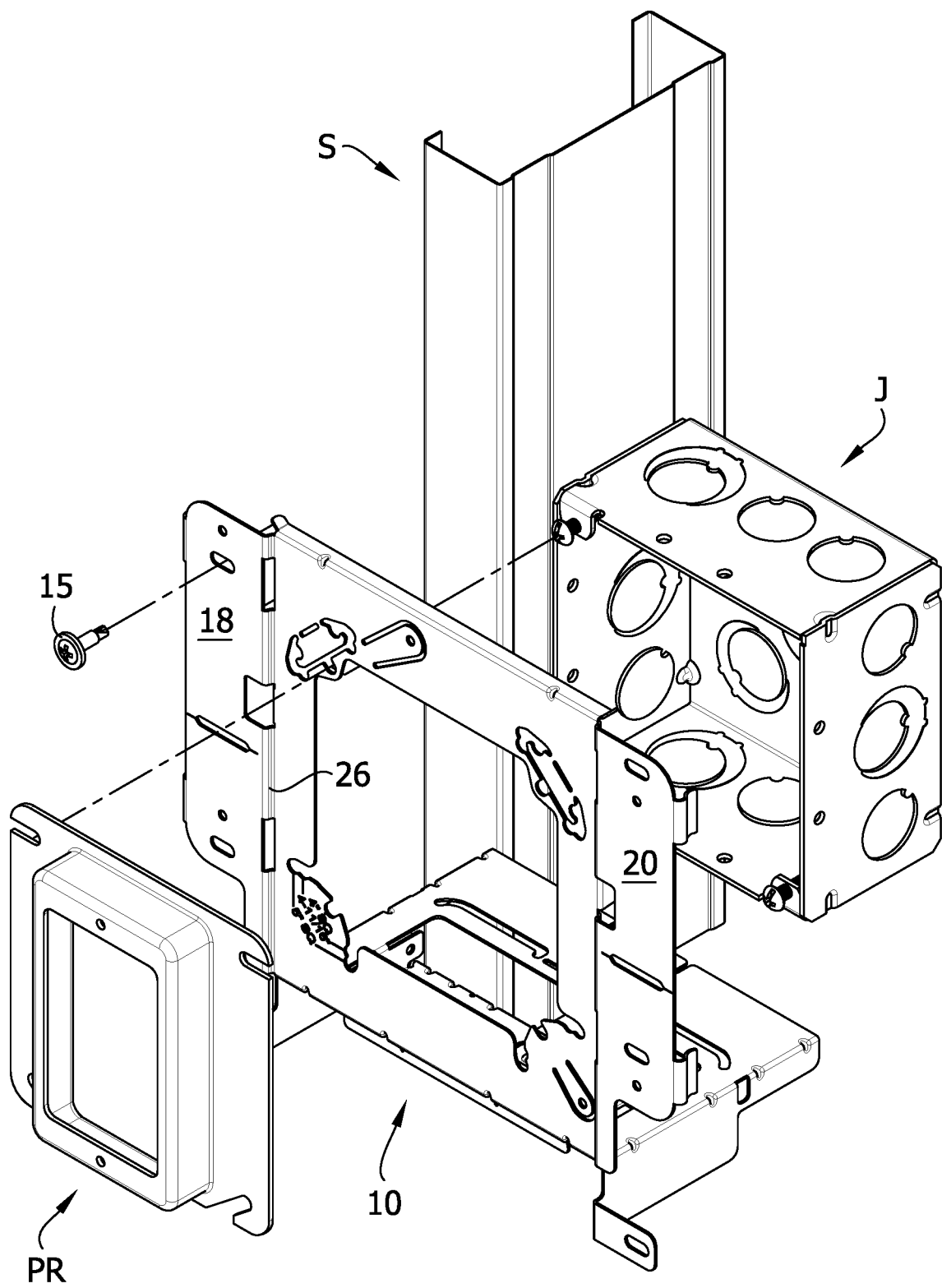
FIG. 15 is an exploded view of the perspective in FIG. 7.

Referring to FIGS. 13-15, to attach the mounting bracket 10 to the stud, one of the stud mounting flanges 18, 20 engages a surface of the stud S such that the stud is positioned in the stud receiving space 24. In the position, the clamping flanges 22, the stud mounting flanges 18, 20, the intermediate flanges 26, 28, the face plate 12, support tabs 32 and/or ears 46, 48 engage the stud to temporarily secure and hold the mounting bracket 10 to the stud. Specifically, the clamping flanges 22 apply a clamping force to the stud S that temporally holds the mounting bracket 10 on the stud. The clamping flanges 22 and corresponding intermediate flange 26, 28 define a width of the stud receiving space 24 that is less than a width of the stud S. When the stud S is inserted into the stud receiving space 24, the stud S deflects the clamping flange 22 outward. Since the clamping flanges 22 are resiliently deflectable, when the stud S deflects the clamping flange 22 outward, the clamping flange is biased against the stud and applies a sufficient amount of clamping force to the stud to hold the mounting bracket 10 on the stud. This allows an operator (e.g., construction worker) to insert fasteners through the fasteners openings 19, 21 to permanently mount the mounting bracket 10 to the stud S without having to manually hold the mounting bracket in position while installing the fasteners. Moreover, in this position, the side flanges 36, 38, support tabs 32 and/or front connection tabs 40, 42 may also engage the stud S to provide additional stability when the mounting bracket 10 is temporarily held and then permanently secured on the stud. Similarly, each ear 46, 48 may also be deflected by the stud S when the stud is inserted into the stud receiving space 24 and also apply a clamping force to the stud to help hold the mounting bracket 10 on the stud.

Figure 16:
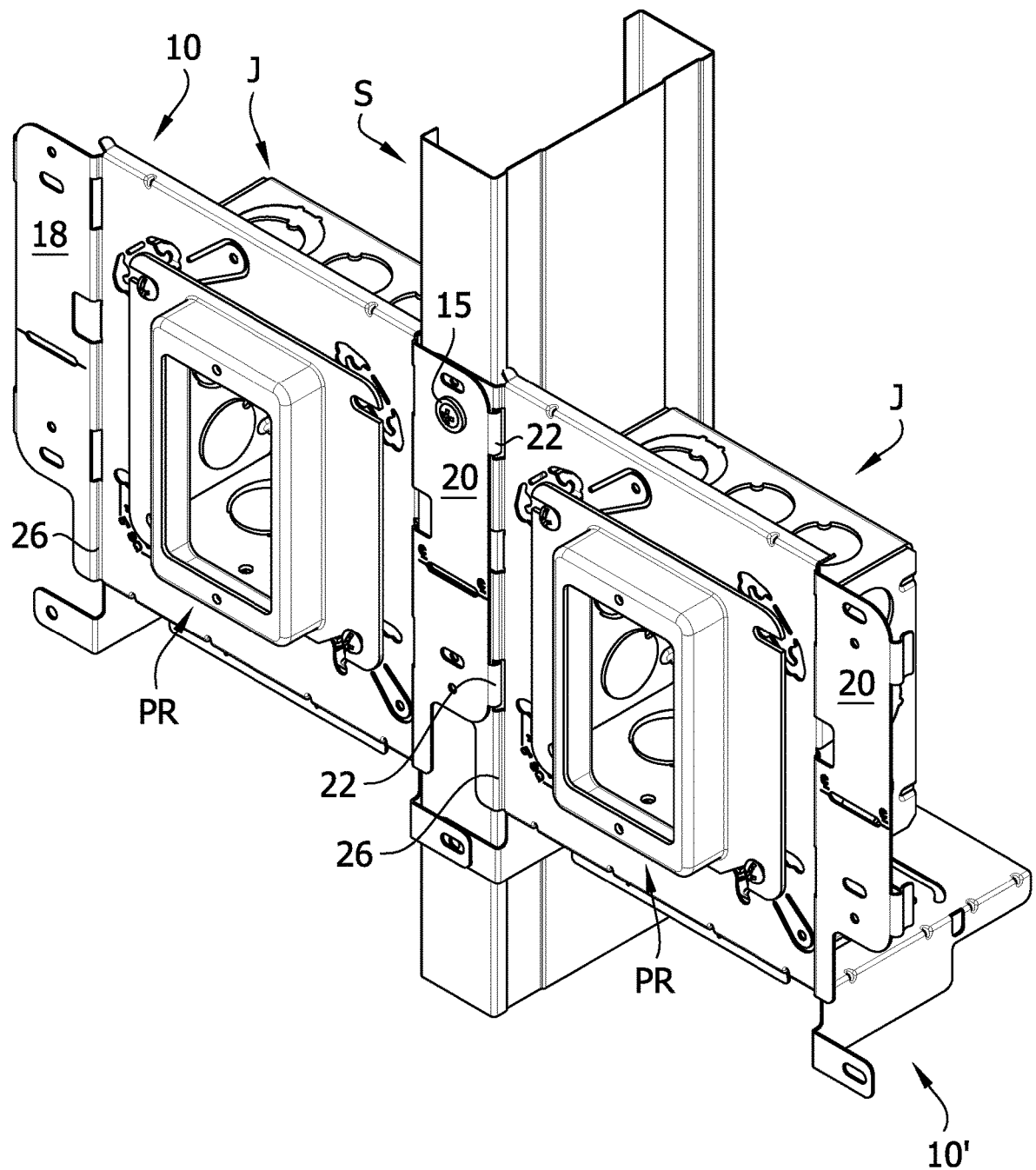
FIG. 16 is a perspective of two mounting brackets, as shown in FIG. 1, attached to a stud in an overlapping, side-by-side arrangement and extending from opposite sides of the stud.

Referring to FIG. 16, the mounting bracket 10 is configured to overlap with a second mounting bracket 10' in a side-by-side arrangement on either side of the stud. This permits two or more mounting brackets 10, 10' to be attached to the stud S at the same height on the stud. Mounting bracket 10' is identical to mounting bracket 10, although in other embodiments the mounting brackets may not be identical. To attach two mounting brackets 10, 10' together on the stud S in this overlapping, side-by-side arrangement, the left stud mounting flange 18 of the second mounting bracket 10' is inserted into the stud receiving space 24 defined, at least in part, by the right stud mounting flange 20 of the first mounting bracket 10 (or vice versa). In this arrangement, the right stud mounting flange 20 of the first mounting bracket 10 overlaps and engages the left stud mounting flange 18 of the second mounting bracket 10'. The upper and lower clamping flanges 22 extending from the right stud mounting flange of the first mounting bracket are inserted into and extend through the upper and lower slots 30, respectively, on the left side of the second mounting bracket 10'. This creates an interlocking engagement between the two mounting brackets 10, 10' with the stud S being positioned there-between. The interlocking of two mounting brackets 10, 10' on the stud S provides even more stability for the mounting brackets when they are temporarily positioned on the stud. In this position, the stud S is disposed between the clamping flanges 22 of each mounting bracket 10, 10'. In addition, the corresponding fastener openings 19, 21 on the mounting brackets 10, 10' are aligned in this overlapping arrangement such that a fastener 15 can be inserted through both brackets (e.g., a stud mounting flange of each bracket) to secure the brackets to the stud S.

Figure 17:
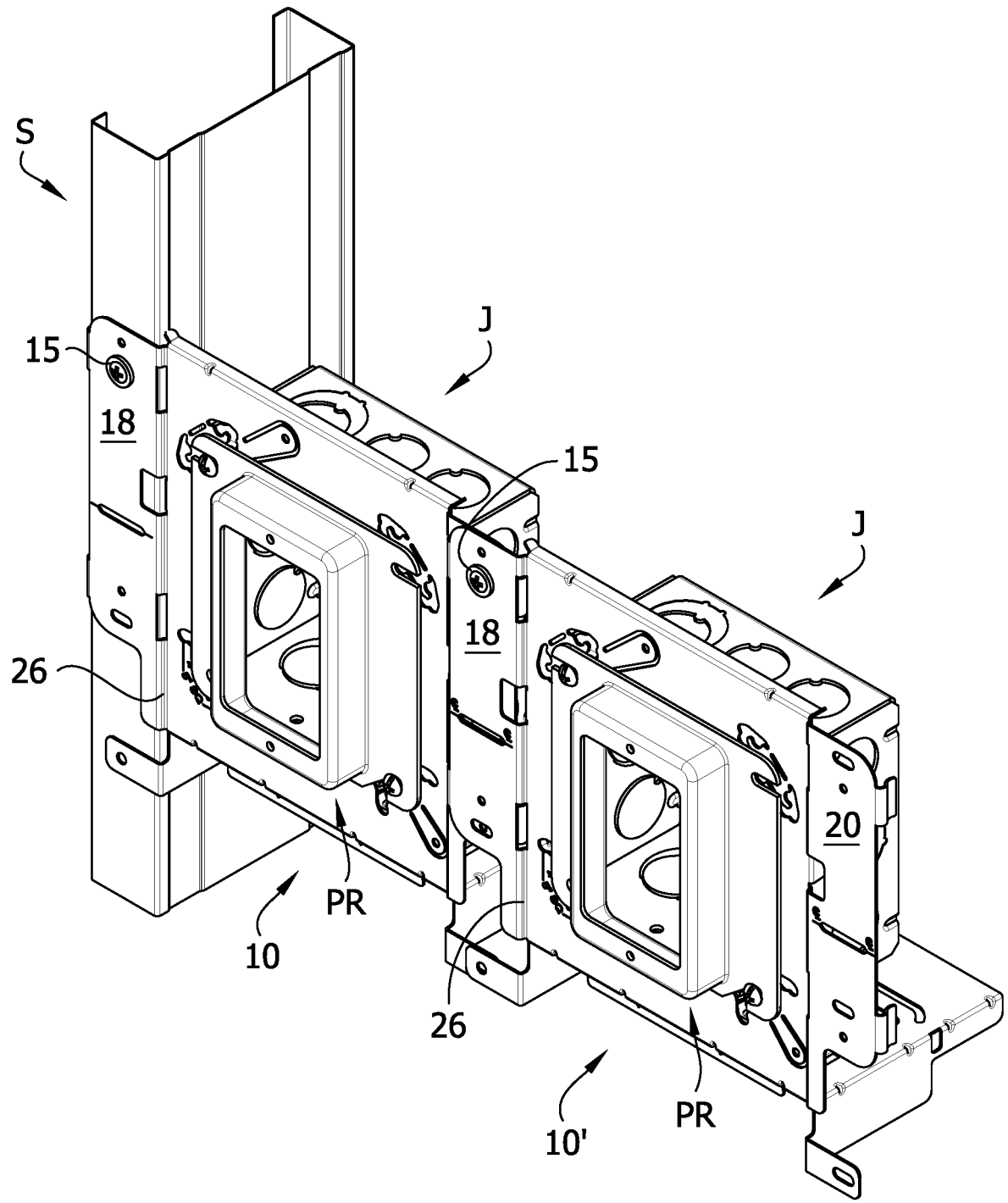
FIG. 17 is a perspective of two mounting brackets, as shown in FIG. 1, attached together in an overlapping, side-by-side arrangement and extending from one side of a stud with one of the mounting brackets attached directly to the stud.

Referring to FIG. 17, in another embodiment the adjacent mounting brackets 10, 10' can be attached together in a side-by-side relationship without positioning a stud S there-between. This allows one or more mounting brackets to be installed between studs S of the wall at the same height by attached the additional mounting brackets in an overlapping, side-by-side relationship to a mounting bracket 10, 10' already coupled to the stud of the wall. A fastener 15 may be used to secure the mounting brackets 10, 10' together.

Figure 18:
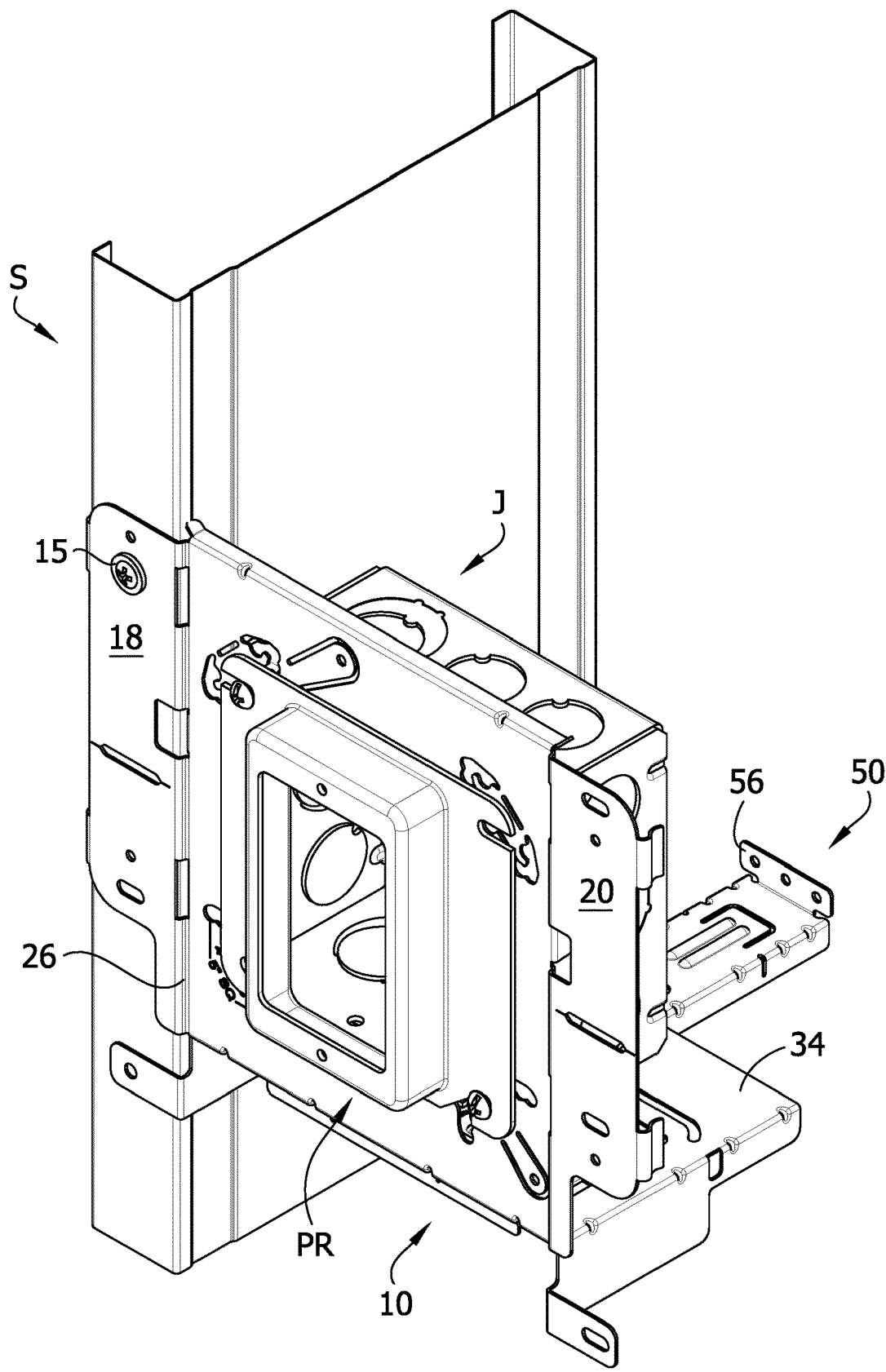
FIG. 18 is a perspective of the mounting bracket of FIG. 1 with the detachable leg attached to the mounting bracket at a second location.

Referring to FIGS. 3, 7-11, and 18, the mounting bracket 10 may include a detachable leg 50 removably (e.g., releasably) attached to the mounting bracket, specifically the base flange 34. The leg 50 is releasably coupled at a first location on the mounting bracket 10 and is configured to uncouple from this first location in order to couple to the mounting bracket at another (e.g., second) location on the mounting bracket. In the illustrated embodiment, the leg 50 is releasably coupled to the base flange 34 at the first location. In this position, the leg 50 is generally disposed below the base flange 34 (e.g., disposed below the face plate 12) so that the leg does not interfere with attaching a junction box J to the face plate. This positioning permits the leg 50 to remain releasably coupled at the first location on the mounting bracket 10 even when a junction box J is attached to the face plate 12. At the second location (e.g., first re-coupling location) on the mounting bracket 10, as shown in FIG. 18, the leg 50 increases the distance between the face plate 12 and the rear-most point of the mounting bracket (a point on the leg) so that the rear-most point of the mounting bracket can engage the inside of the opposite face of the wall when studs S of larger depths are used (e.g., increase the overall mounting bracket depth), as described above. This provides additional support for the mounting bracket 10 when secured to the larger stud S and prevents the mounting bracket from moving (e.g., bending) in a rearward direction.

The leg 50 has a central flange 52 and two, generally parallel, side flanges 54 extending downward from opposite edge margins of the central flange, a first end flange 56 extending upward from one end edge margin of the central flange and an opposite insertion flange 58 extending downward from the opposite end edge margin of the central flange. The side flanges 54, first end flange 56 and insertion flange 58 are all generally perpendicular to the central flange 52. The leg 50 has a length extending between the opposite end edge margins of the central flange. The first end flange 56 may define one or more faster openings, such as circular fastener openings 53. The central flange 52 and one of each of the side flanges 54 define opposite slots 60 there-between adjacent one end of the leg (e.g., insertion flange 58). Each slot 60 extends from one end of the leg 50 toward the other end and is sized and shaped to receive the base flange 34 therein. In the illustrated embodiment, a breakable or frangible link 49 connects the leg 50 (e.g, the first end flange 56) to the base flange 34. The frangible link 49 is configured to break to permit an operator manually snap off the leg 50 from the base flange 34 to detach the leg. For example, in the illustrated embodiment, the frangible link 49 is a thin piece of material and the operator can rotate and/or twist the leg 50 to break the frangible link. In another embodiment, the first end flange 56 is attached to the base flange 34 at the first location with a line of perforations (not shown) separating the components. The line of perforations releasably couples the first end flange 56 to the base flange 34. The line of perforations allows an operator to manually snap off the leg 50 from the base flange 34 to detach the leg from the first location. Other manners and configurations of releasably coupling the leg 50 to the components of the mounting bracket 10 are within the scope of the present disclosure. In one embodiment, the leg 50 may not be releasably coupled to the mounting bracket 10 but be a separate component to be used in conjunction with the mounting bracket 10.

In one embodiment, the leg 50 is configured to have an adjustable length in order to allow the leg to conform to the depth of the stud S to which the mounting bracket 10 is being secured to. For example, in the illustrated embodiment, the length of the leg 50 is such that the leg 50, specifically the first end flange 56, engages the inside of the opposite face of wall when mounted on a stud S having a depth of 6 inches (FIG. 18). The length of the leg 50 can be changed so that when the leg is on the mounting bracket 10 in the second position, the leg can engage the inside of the opposite face of the wall when mounted on a stud S having a different depth, such as a depth of 4 or 5.5 inches. Other dimensions are within the scope of the present disclosure.

In the illustrated embodiment, the leg 50 defines two pairs of guide slots 68 and for adjusting the length of the leg. The two pairs of guide slots 68 are spaced apart longitudinally along the length of the leg. Each pair of guide slots 68 comprises slots directly across from one another on each side flange 54 (e.g., an imaginary line extending between the guide slots is generally perpendicular to the longitudinal axis of the leg 50). Each guide slot 68 extends downward from the central flange 52 toward the bottom edge margin of each side flange 54. The leg 50 also includes tab slots 70 defined by the central flange 52. The tab slots 70 have a U-shape. Each tab slot 70 defines a tab 72 configured to engage the inside of the opposite face of the wall when the length of the leg 50 is adjusted. Each pair of guide slots 68 on the side flanges 54 are aligned with ends of one of the guide slots 72. The guide slots 68 and corresponding tab slots 70 are disposed between the opposite ends of the leg 50. In the illustrated embodiment, the two pairs of guide slots 68 and corresponding tab slots 70 are disposed so that the length of the leg 50 can be adjusted to correspond to two different stud S depths, such as studs having a depth of 4 or 5.5 inches. The guide slots 68 and tab slots 70 may be disposed at any position on the leg 50 to shorten the leg to correspond to any desired stud S depth. More or less pairs of guide slots 50 and corresponding tab slots 70 are within the scope of the present disclosure.

Figure 10:
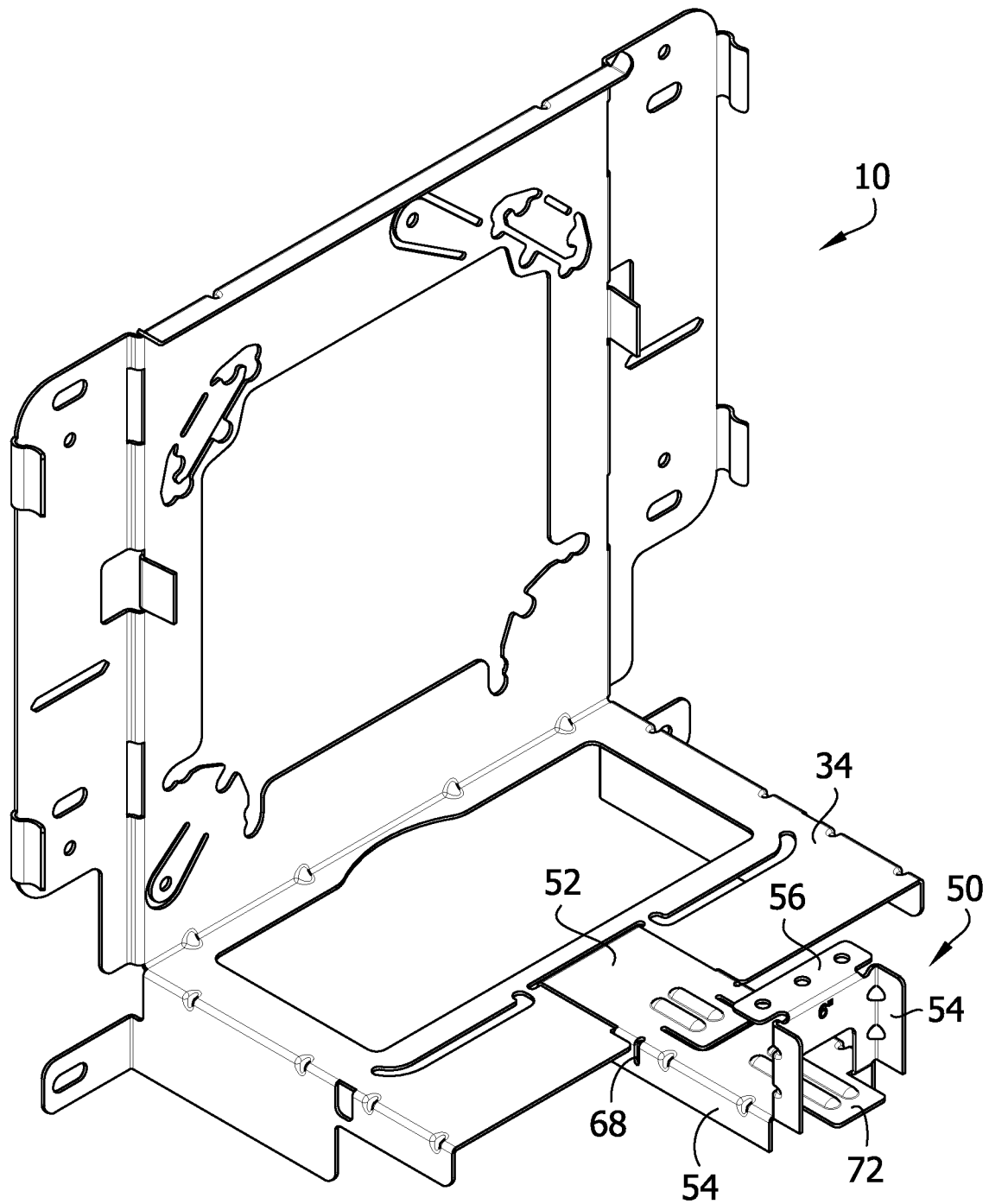
FIG. 10 is a rear perspective of the mounting bracket of FIG. 1 with the detachable leg attached to the mounting bracket at the first coupling location with the length of the detachable leg adjusted to a first length.
Figure 11:
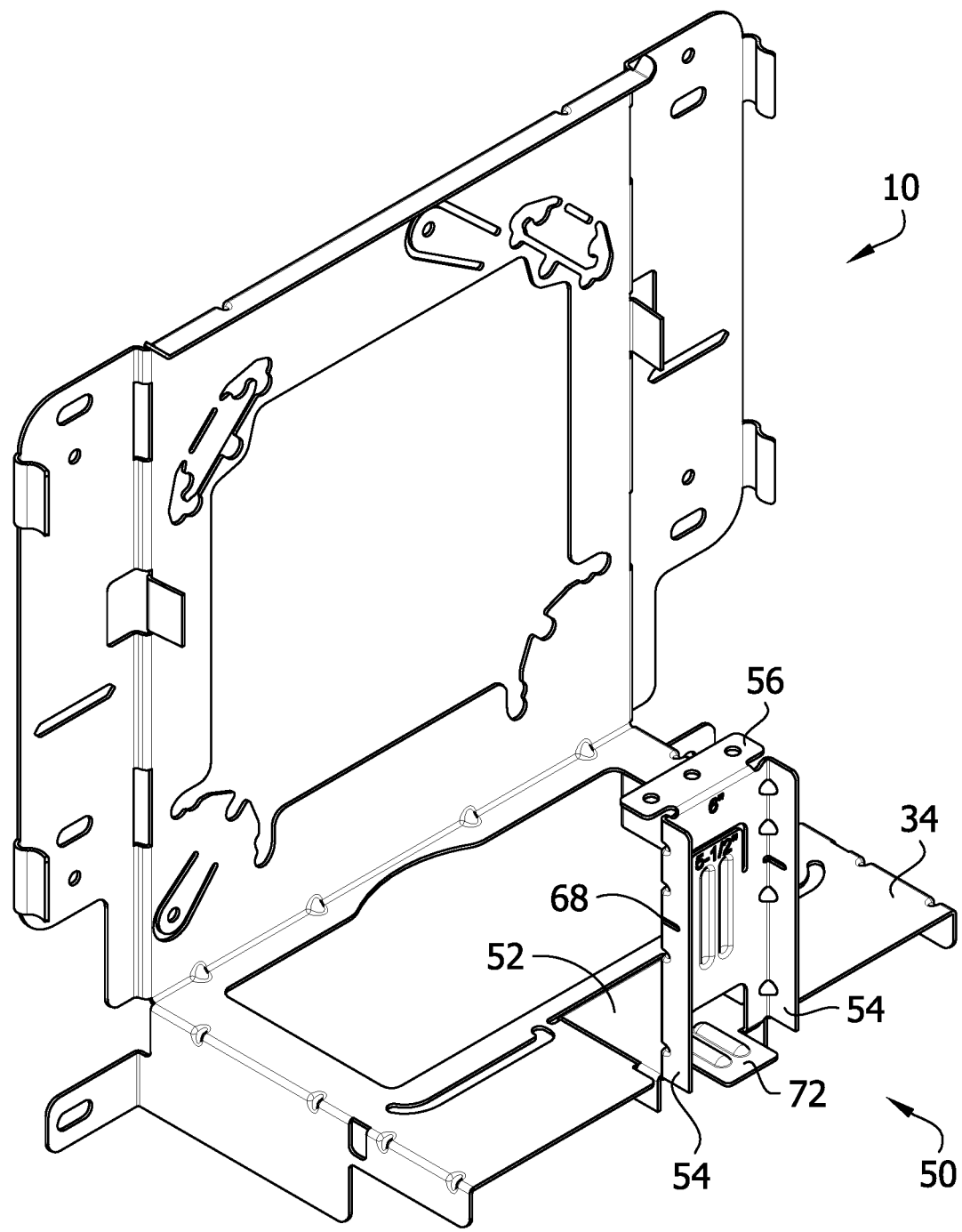
FIG. 11 is a rear perspective of the mounting bracket of FIG. 1 with the detachable leg attached to the mounting bracket at the first coupling location with the length of the detachable leg adjusted to a second length.

Each pair of guide slots 68 indicates a cutting location on the side flanges 54 in order to change the length of the leg 50. To change the length of the leg 50, an operator cuts from the side flanges 54 at the desired pair of guide slots 68 to divide the side flange into two separate parts (e.g., front and rear parts). With reference to FIG. 8, the cuts are made generally vertically on the side flanges 54 and generally transverse to the longitudinal axis of the leg 50. Referring to FIGS. 10 and 11, the operator selects which pair of guide slots 68 to use as a cutting guide based on the depth of the stud S to which the mounting bracket will be mounted. In other words, the operator selects the pair of guide slots 68 to use as a cutting guide based on the length the leg 50 needs to be changed to in order to correspond to the depth of the stud S to which the mounting bracket is being mounted. The cut can be made with any suitable tool. The leg 50 may include indicia (FIG. 9) to indicate the depth of the stud S the guide slots 68 (and first end flange 56) correspond to.

Figure 7:
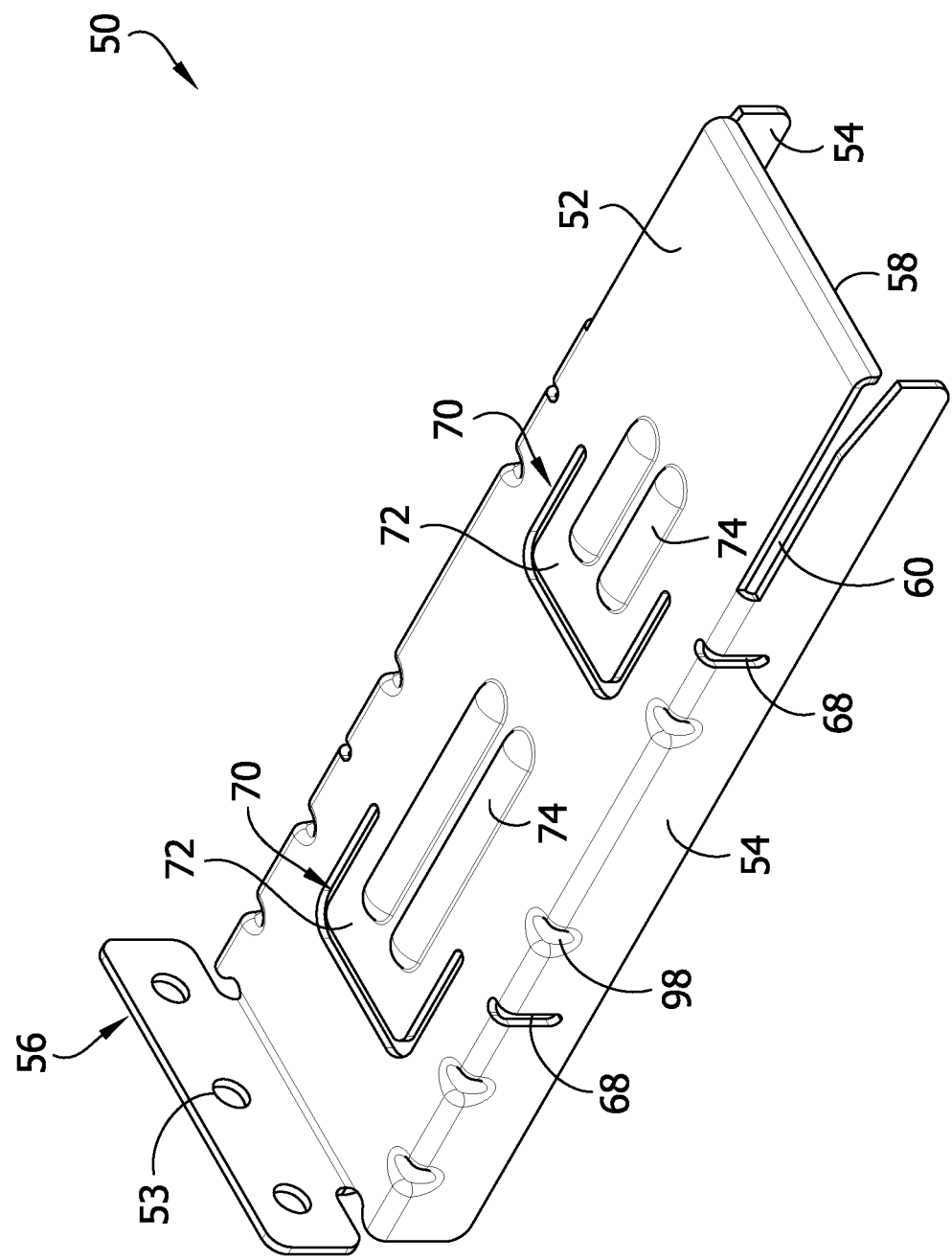
FIG. 7 is a perspective of a detachable leg of the mounting bracket of FIG. 1.

Referring to FIGS. 7, 10 and 11, after the side flanges 54 of the leg 50 have been cut, the portion of the leg including the first end flange 56 is bent upward to shorten the length of the leg. The portion of the leg 50 including the first end flange 56 is bent approximately 90° such that the portion of the central flange 52 adjacent the first end flange is generally perpendicular to the portion of the central flange adjacent the insertion flange 58. FIG. 10 illustrates the length of the leg 50 adjusted to a first length, such as a length corresponding to a stud S having a depth of 5.5 in. FIG. 11 illustrates the length of the leg 50 adjusted to a second length, such as a length corresponding to a stud S having a depth of 4 in. In the bent configuration, one of the tabs 72 is now exposed so that the tab can engage the inside of the opposite face of the wall to support the mounting bracket 10 when the leg 50 is attached to the mounting bracket at the second location. Preferably, the portion of the side flanges 54 that moved with the bent portion of the central flange will also engage the inside of the opposite face of the wall to support the mounting bracket 10. In this embodiment, the side flanges 54 have a height (e.g., distance between the central flange 52 and opposite edge margin) that generally matches the length of the tab 72 so that when a portion of the side flanges is moved by the bending, the rear edge margins of the tab and portions of the side flanges are generally coplanar. The central flange 52 may also include one or more ribs 74 to strengthen and stiffen the tab 72. Similar to the relief slots 39 discussed above, the tab slots 70 create points of weakness (e.g., bendable links) in the central flange 52 of the leg 50 to enable the central flange to be manually bent by the operator after the cuts are made.

FIGS. 1 and 3 show the leg 50 attached to the bracket 10 in a shipped or manufactured configuration. In the shipped configuration, the leg 50 is releasably coupled to the base flange at the first location. As shown in FIG. 8, the leg 50 is configured to be detached from the first location (broadly, the mounting bracket 10) and re-attached to the mounting bracket at a second location (e.g., a first re-coupling location) on the base flange 34. As shown in FIG. 8, the base flange 34 defines slots 62, 64, 66 which are configured to receive the leg 50 to re-secure (e.g., re-connect) the leg to the base flange (broadly, the mounting bracket 10) at the second location (e.g., first re-coupling location). Slot 66 is configured to receive the insertion flange 58, and slots 62, 64 are each configured to receive portions of each side flange 54. When the leg 50 is attached to the second location on the mounting bracket 10, a portion of the central flange 52 overlies and engages the top surface of the base flange 34, the base flange is disposed in the slots 60 of the leg, the leg is disposed in the slots 62, 64, 66 and the portions of the side flanges 54 defining the slots 60 underlie and engage the bottom surface of the base flange. This results in a general interlocking engagement between the leg 50 and base flange 34 (between slots and flanges) and secures the two together. By attaching the leg 50 to the mounting bracket 10 at the second location, the leg acts as an extension of the base flange 34. This allows the mounting bracket 10 to engage the inside of the opposite face of the wall (e.g., drywall) when mounted on studs S with deeper depths (e.g., deeper wall depths), such as studs that are 4 inches, 5 inches or 6 inches (FIG. 18) deep rather than 3.5 inches deep (which is the depth of the studs shown in the other figures).

The mounting bracket 10 is configured to have an adjustable depth in order to match the depth of the stud S the mounting bracket is attached to. The combination of the adjustable length of both the base flange 34 and leg 50 enable the depth of the mounting bracket 10 to be adjusted (e.g., increased or decreased) to fit the depth of the stud S, and therefore the wall, to which the mounting bracket is attached. For example, in one embodiment, the mounting bracket 10 has a starting (e.g., original, manufactured) depth to fit a stud S having a depth of 3.5 in but the depth of the mounting bracket can be changed to fit a stud having a depth of 2.5 in, 4 in, 5.5 in or 6 in, as described above. Other depths are within the scope of the present disclosure.

Figure 9:
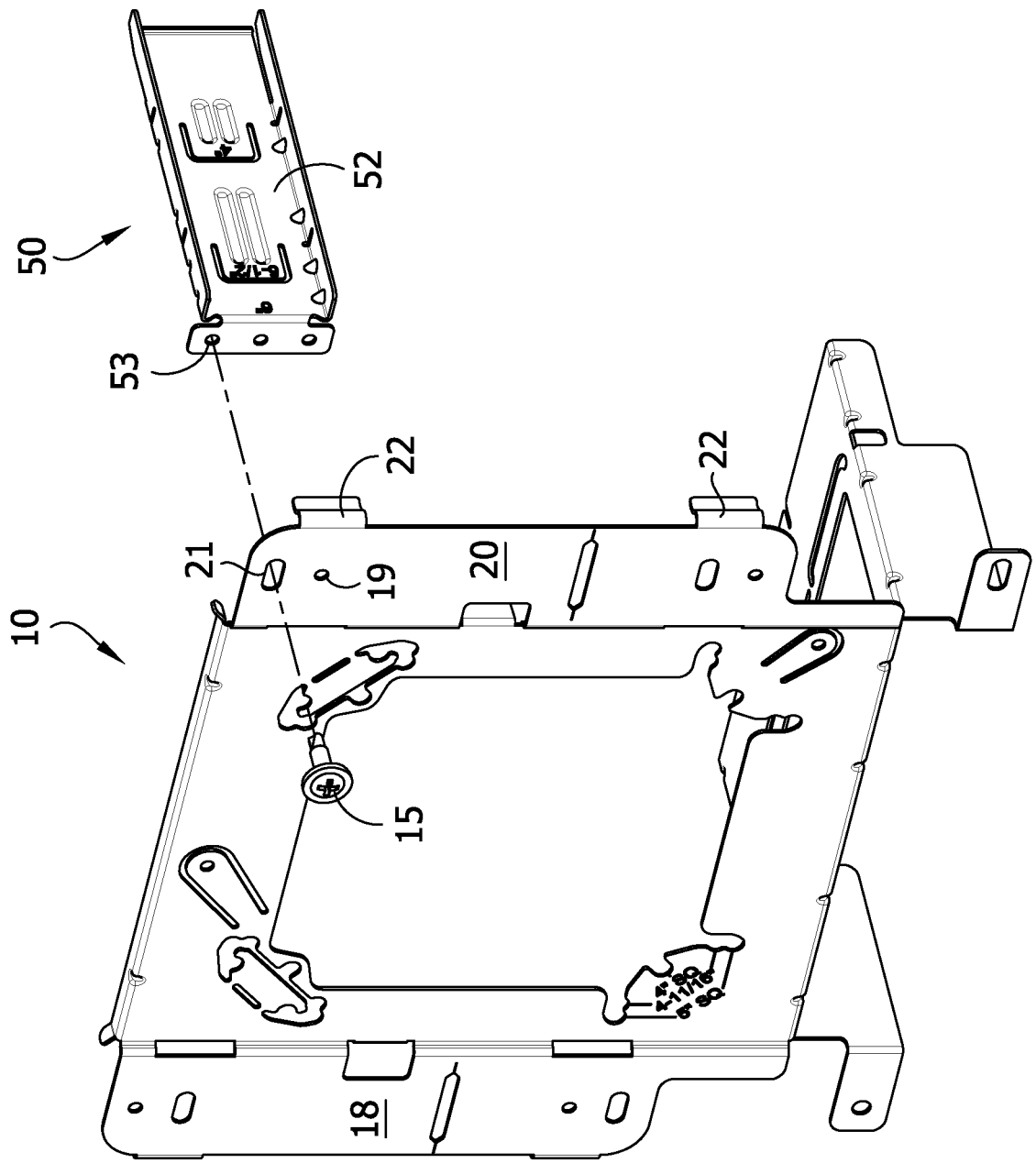
FIG. 9 is an exploded view of the mounting bracket of FIG. 1 showing the detachable leg removed from a second re-coupling location on the mounting bracket.

Referring to FIG. 9, in addition to being re-secured at the second location, the leg 50 can also be re-secured at a third location (e.g., a second re-coupling location) on either the left or right stud mounting flanges 18, 20. In other words, the leg 50 is configured to be detached form the mounting bracket 10 and reattached to the mounting bracket at one or more other locations (e.g., locations different from the initial attachment). One or more of the circular fastener openings 53 defined by the first end flange 56 can be aligned with one or more of the fastener openings 19, 21 on the stud mounting flanges 18, 20 of the mounting bracket 10 such that a fastener 15 can be receive therein to re-attach the leg 50 to the mounting bracket. Furthermore, the fastener 15 can be inserted into the stud S to secure the stud mounting flange 18, 20 and leg 50 to the stud as well. In this position, the leg 50 (specifically, the central flange 52) is configured to overlie and engage the same side of the stud S engaged by the clamping flanges 22 to provide additional support for the mounting bracket 10 when the mounting bracket is secured to the stud. When attached to the mounting bracket 10 in the third location (e.g., second re-coupling location), the central flange 52 of the leg 50 engages the upper clamping flange 22 such that the leg is disposed between the clamping flange and the stud S. Even with the leg 50 in the second location, the clamping flange 22 is still able to temporarily hold the mounting bracket 10 on the stud S (by pushing the leg against the stud) with the leg providing some additional support for further stability. In this position, the leg 50 will also provide additional stability and support if an additional mounting bracket is attached in a side-by-side relationship without a stud S there-between, as described above. Additionally or alternatively, the leg 50 may be re-attached to the mounting bracket 10 at other locations on the mounting bracket and/or in other ways.

The mounting brackets described above may be formed as a unitary, one-piece construction. The mounting brackets can be formed from a single sheet metal (e.g., steel or aluminum) that is cut and bent into shape or from any other suitable material. In addition, one or more of the bends used to form the mounting bracket 10 may include one or more indentations 98 extending across the bend and between the adjacent components on either side of the bend. The indentations 98 strengthen and stiffen the bend to prevent the components on either side of the bend from any further bending relative to one another during use.

Figure 19:
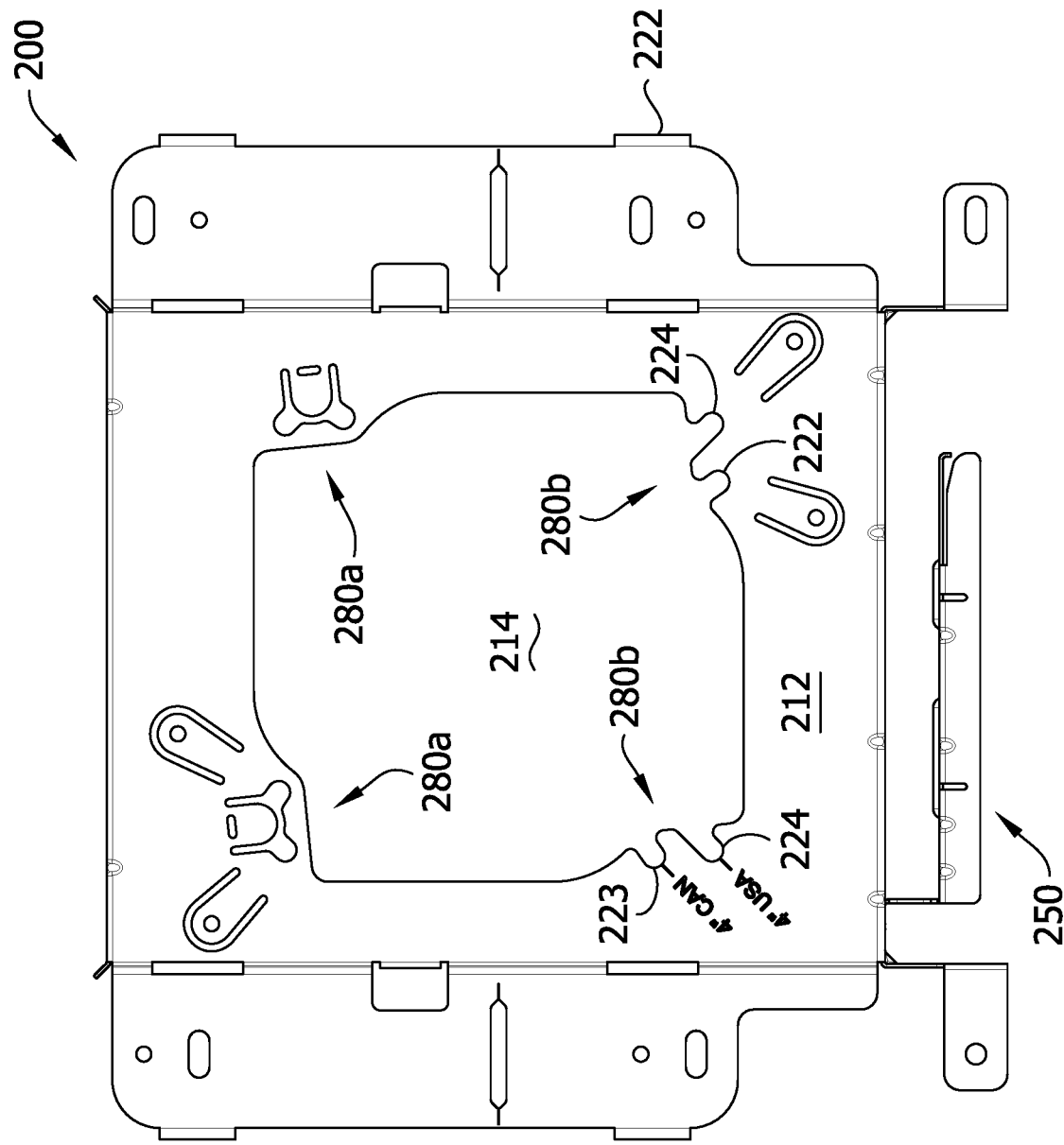
FIG. 19 is a front view of another embodiment of a mounting bracket of the present disclosure.

Referring to FIG. 19, another embodiment of a mounting bracket for mounting a junction box J on a stud of a wall is generally indicated at reference numeral 200. Mounting bracket 200 is similar to mounting bracket 10 and, thus, for ease of comprehension, where similar or analogous parts are used, reference numerals "200" units higher are employed. Mounting bracket 200 is the same as mounting bracket 10 except that mounting bracket 200 has different box mounting openings. Instead of first and second box mounting opening types 16a, 16b, mounting bracket 200 includes first and second box mounting opening types 280a and 280b, respectively. First and second box mounting opening types 280a, 280b are used to connect junction boxes J of other designs than described above, such as United States or Canadian 4×4 inch size junction boxes produced by Iberville. As described above, the first and second box mounting opening types 280a, 280b are configured to receive a fastener in a plurality of different locations to enable junction boxes J of different configurations to attach to the mounting bracket 200 and in different orientations. The first box mounting opening type 280a is generally known in the art and described in U.S. Pat. No. 5,595,362, hereby incorporated by reference in its entirety. The second box mounting opening type 280b includes a first fastener opening 223 that receives the fastener that connects the junction box J to the mounting bracket 200 at one location and a second fastener opening 224 that receives the fastener at another location on the face plate 212.

The first and second fastener openings 223, 224 are each sized and shaped to receive a single fastener at one location on the face plate 212. Accordingly, the second box mounting opening type 280*b* can receive the fastener at two different locations (broadly, at least two locations). More or fewer locations are within the scope of the present disclosure. In this embodiment, the first and second fastener openings 223, 224 are continuous with the central opening 214. The first and second mounting box opening types 280*a*, 280*b* are arranged so that a 4×4 in size junction box J can be attached to the mounting bracket 200, regardless of the junction box's orientation or style of manufacture. For example, in one embodiment, the first fastener opening 223 is used for one style of 4×4 in size junction box J (e.g., a Canadian 4×4 in junction box produced by Iberville) in any orientation; and the second fastener opening 224 is used for another style of 4×4 in size junction box J (e.g., a U.S. 4×4 in junction box produced by Iberville) in any orientation. Accordingly, it is appreciated that when a fastener is received in the first or second fastener opening 223, 224 of the second box mounting opening type 280*b* to attach a 4×4 in size junction box J to the mounting bracket 200, a fastener is also received in the first box mounting opening types 280*b*. In one embodiment, indicia may be provided to identify which fastener openings are used for the different styles of junction boxes J. As described above, the edges defining the first and second fastener openings 223, 224 are configured to engage a fastener inserted through the openings to keep the junction box J positioned and centered over the central opening 214. Otherwise, mounting bracket 200 is generally the same as mounting bracket 10 and operates in the same/similar way.

Figure 20:
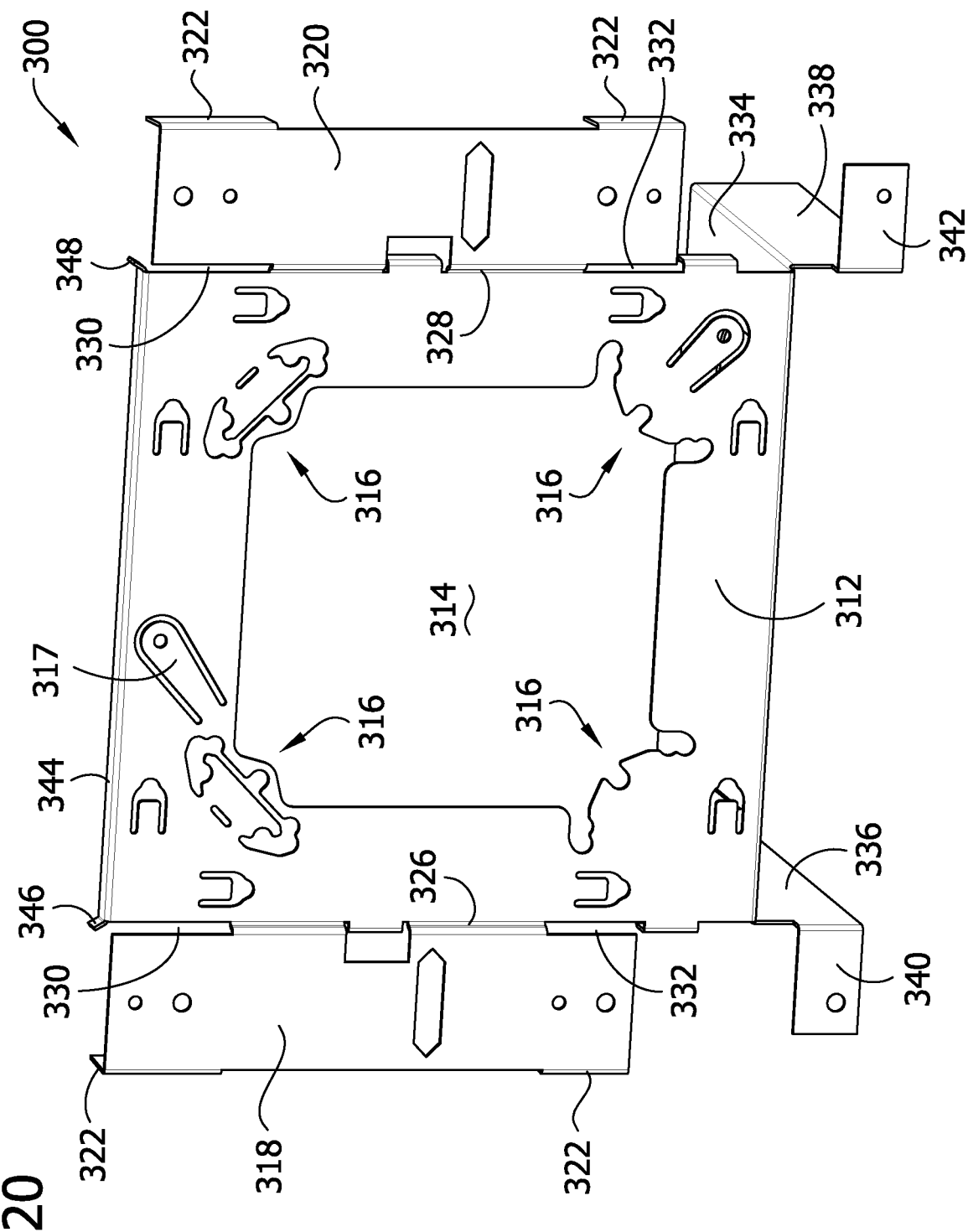
FIG. 20 is a perspective of another embodiment of a mounting bracket of the present disclosure.

Referring to FIG. 20, another embodiment of a mounting bracket for mounting a junction box J on a stud of a wall is generally indicated at reference numeral 300. Mounting bracket 300 is similar to mounting bracket 10 and, thus, for ease of comprehension, where similar or analogous parts are used, reference numerals "300 " units higher are employed. Mounting bracket 300 is generally the same as mounting bracket 10 except that mounting bracket 300 has a different configuration of clamping flanges 322 and upper and lower slots 330, 332. In this embodiment, clamping flanges 322 are generally planar and extend generally perpendicularly rearward from the mounting flanges 318, 320. In addition, the upper and lower slots 330, 332 of mounting bracket 300 are unbounded (e.g., have an open end). In this embodiment, the intermediate flanges 326, 328 only define lower and upper ends, respectively, of the respective upper and lower slots 330, 332 such that the respective upper and lower ends of the respective upper and lower slots are open. Further, the face plate 312 and mounting flanges 318, 320 have slightly different openings and opening configurations. In addition, mounting bracket 300 does not include a detachable leg. Otherwise, mounting bracket 300 is generally the same as mounting bracket 10 and operates in the same/similar way.

Figure 21:
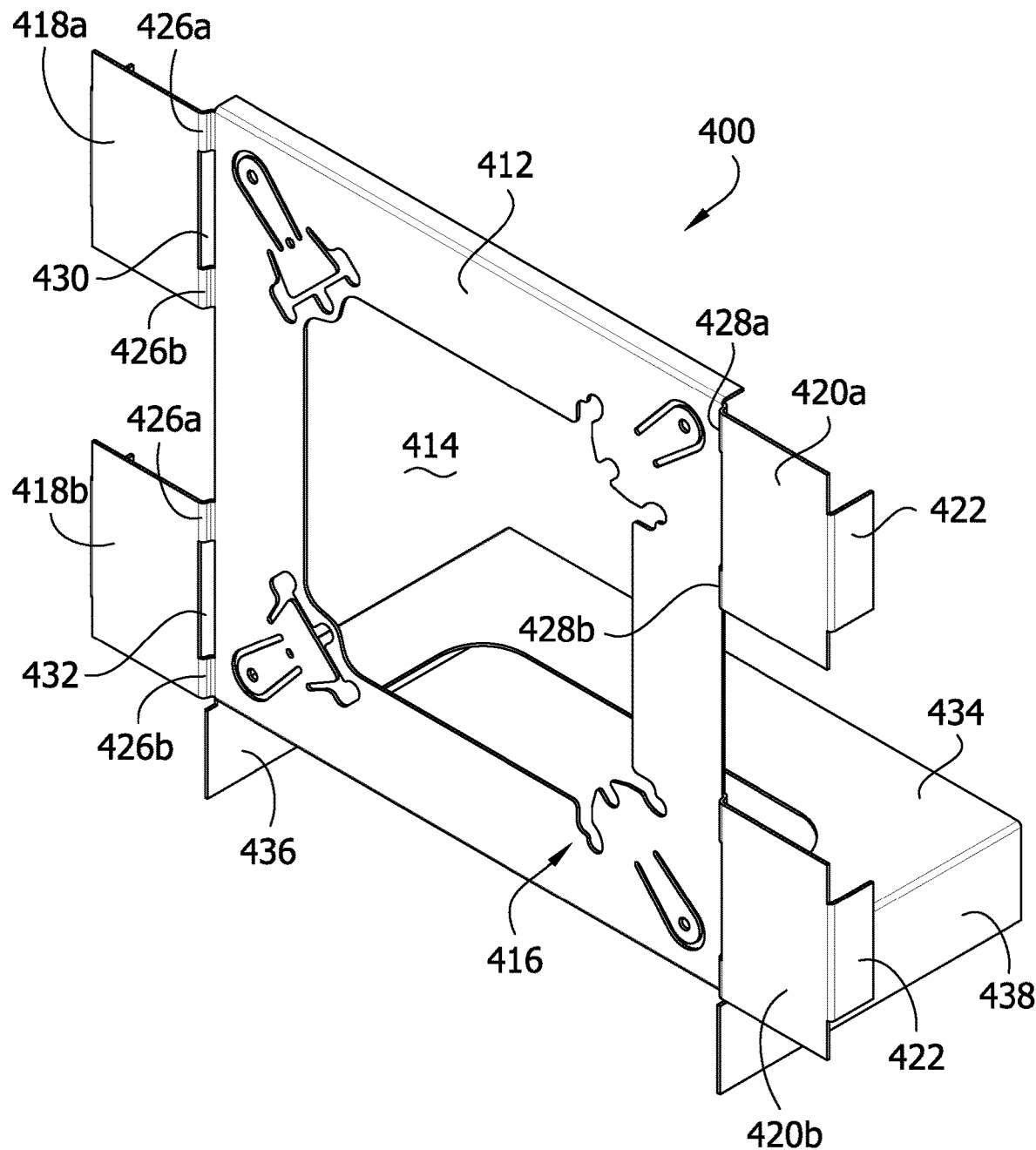
FIG. 21 is a perspective of another embodiment of a mounting bracket of the present disclosure.

Referring to FIG. 21, another embodiment of a mounting bracket for mounting a junction box J on a stud of a wall is generally indicated at reference numeral 400. Mounting bracket 400 is similar to mounting bracket 300 and, thus, for ease of comprehension, where similar or analogous parts are used, reference numerals "100 " units higher are employed. Mounting bracket 400 is the generally the same as mounting bracket 300 except that mounting bracket 400 has upper and lower left and right stud mounting flanges 418*a*, 418*b*, 420*a*, 420*b* extending from either side of the face plate 412. Each upper and lower clamping flange 422 extends from one of the upper and lower mounting flanges 418*a*, 418*b*, 420*a*, 420*b*. Each stud mounting flange 418*a*, 418*b*, 420*a*, 420*b* is connected to the face plate 412 with upper and lower left and right intermediate flanges 426*a*, 426*b*, 428*a*, 428*b*. Each corresponding set of upper and lower intermediate flanges 426*a*, 426*b*, 428*a*, 428*b* defines the upper and lower slots 430, 432 that the clamping flanges 422 of a second mounting bracket are inserted into to interlock the adjacent mounting brackets in an overlapping arrangement, similar to the overlapping arrangement described above in relation to mounting bracket 10. In addition, to the upper and lower stud mounting flanges 418*a*, 418*b*, 420*a*, 420*b*, another difference between mounting bracket 400 and mounting bracket 300 is that mounting bracket 400 does not include front connection tabs extending from the side flanges 436, 438. In addition, the mounting bracket 400 also has box mounting openings 416 of a different configuration. Otherwise, mounting bracket 400 is generally the same as mounting bracket 300 and operates in the same/similar way.

Figure 22:
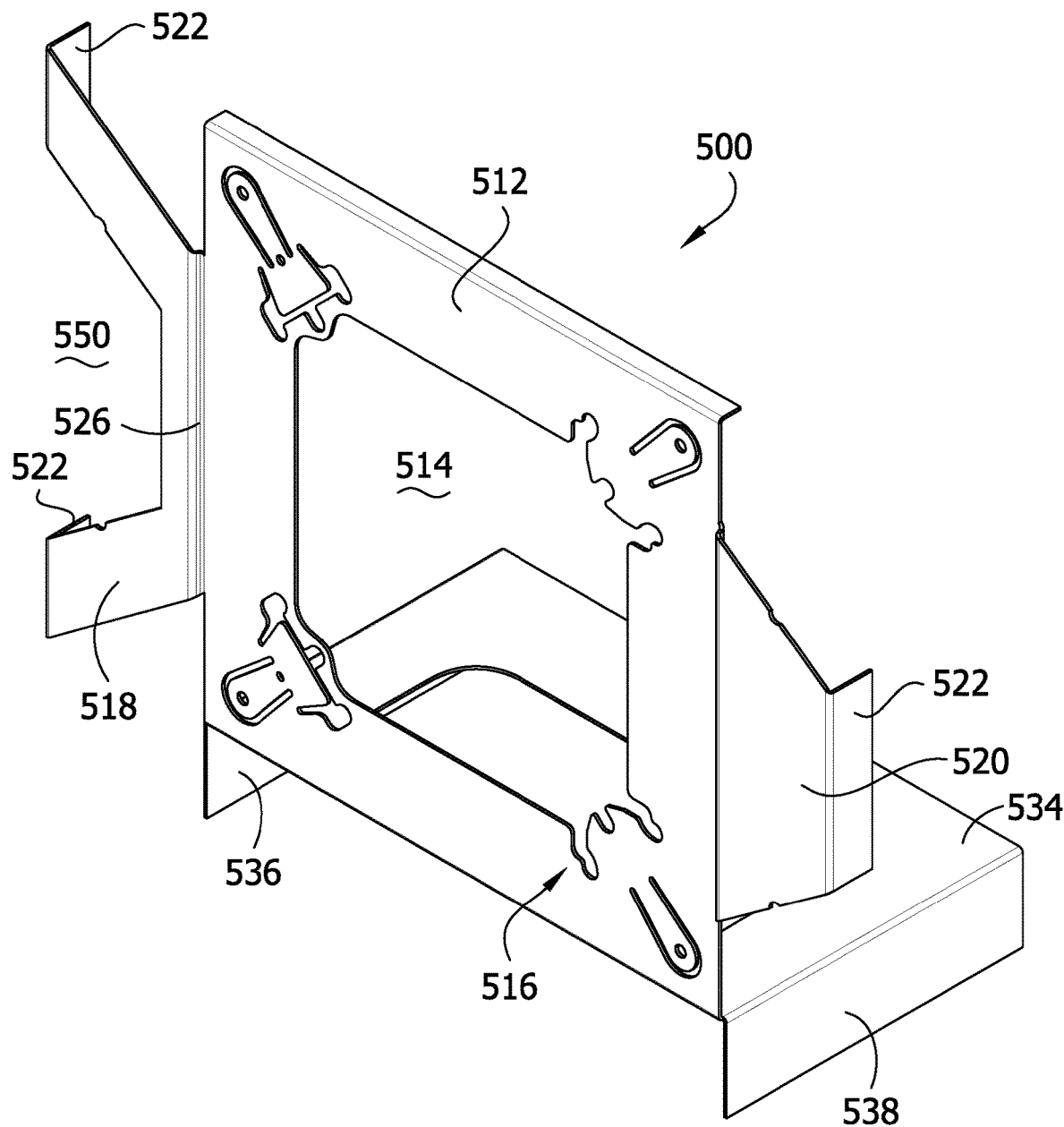
FIG. 22 is a perspective of another embodiment of a mounting bracket of the present disclosure.
Figure 23:
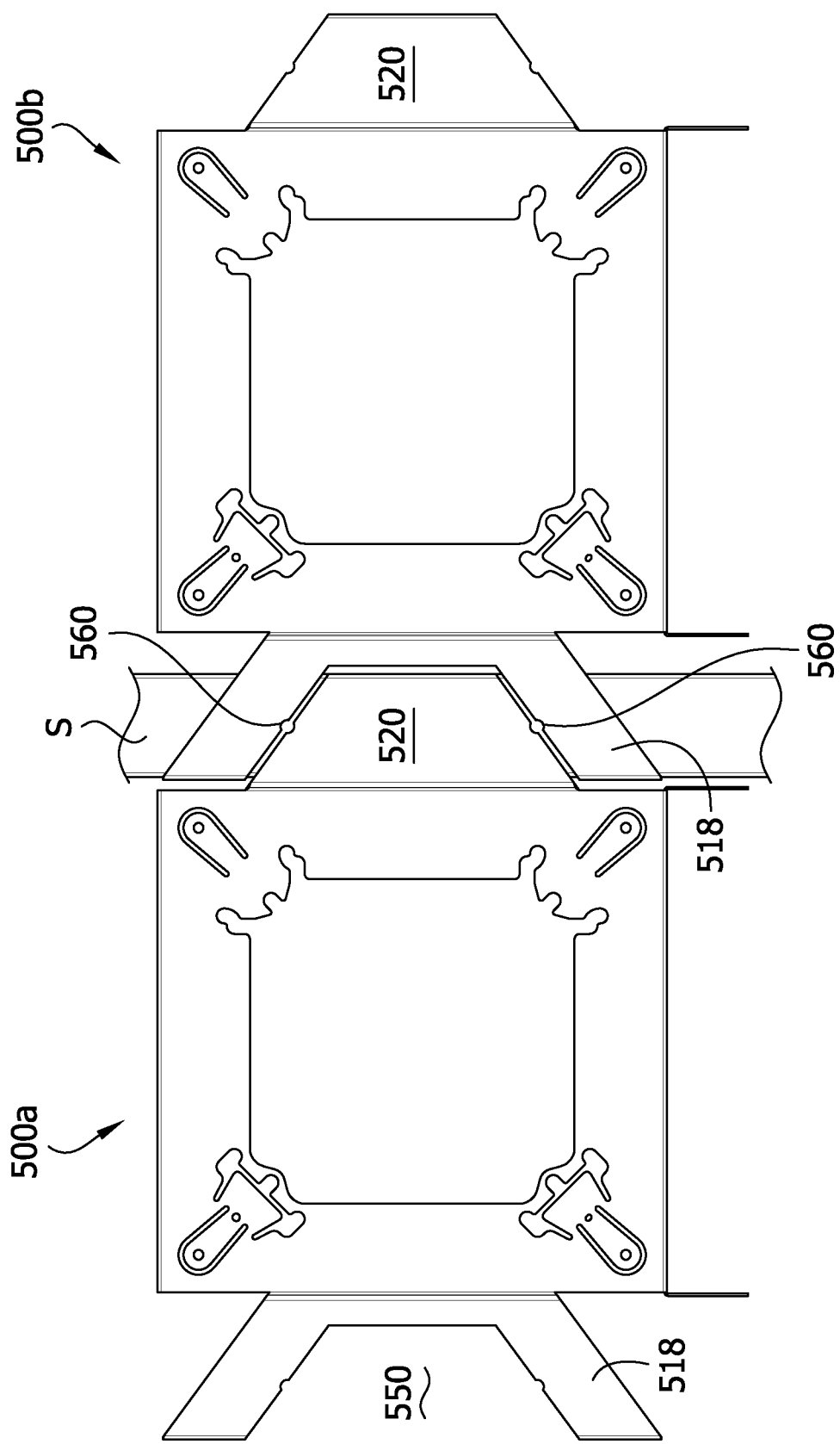
FIG. 23 is a front view of two mounting brackets of FIG. 22 attached to a stud in a non-overlapping, side-by-side arrangement.

Referring to FIGS. 22 and 23, another embodiment of a mounting bracket for mounting a junction box J on a stud of a wall is generally indicated at reference numeral 500. Mounting bracket 500 is similar to mounting bracket 400 and, thus, for ease of comprehension, where similar or analogous parts are used, reference numerals "100" units higher are employed. Mounting bracket 500 is the generally the same as mounting bracket 400 except that mounting bracket 500 has a different configuration of left and right stud mounting flanges 518, 520 that allows adjacent mounting brackets 500*a*, 500*b* (FIG. 23) to be arranged in a side-by-side relationship on the studs S without overlapping one another. The left stud mounting flange 518 defines a space 550 sized and shaped to correspond with the size and shape of the right stud mounting flange 520 so that a right stud flange of an adjacent mounting bracket can be received therein. The illustrated left stud mounting flange 518 has a generally V-shape while the right stud mounting flange 520 has a generally trapezoidal shape. The upper and lower clamping flanges 522 of the left stud mounting flange 518 are respectively positioned above and below the space 550. The right mounting flange 520 only has a single clamping flange 522. In this embodiment, the mounting bracket 500 does not include slots for the clamping flanges of an adjacent mounting member to be inserted into. Instead, the right stud mounting flange 520 of the first mounting bracket 500*a* is inserted into the space defined by the left stud mounting flange 518 of the second mounting bracket 500*b* when the mounting brackets are attached to the stud in a side-by-side relationship. This configuration prevents one mounting bracket from overlapping another. One or more edge margins of the left stud mounting flange 518 that define the space 550 also define one or more partial fastener openings that arranged to be aligned with corresponding one or more partial fastener openings defined by one or more edge margins of the right stud mounting flange 520 so that together they define a single fastener opening 560 when mounting brackets 500*a*, 500*b* are in a side-by-side arrangement on the stud S. This enables a fastener to be inserted into each fastener opening 560 defined by both mounting brackets 500*a*, 500*b*, thereby allowing the fastener to engage and secure both mounting brackets to the stud. Otherwise, mounting bracket 500 is generally the same as mounting bracket 400 and operates in the same/similar way.

Figure 24:
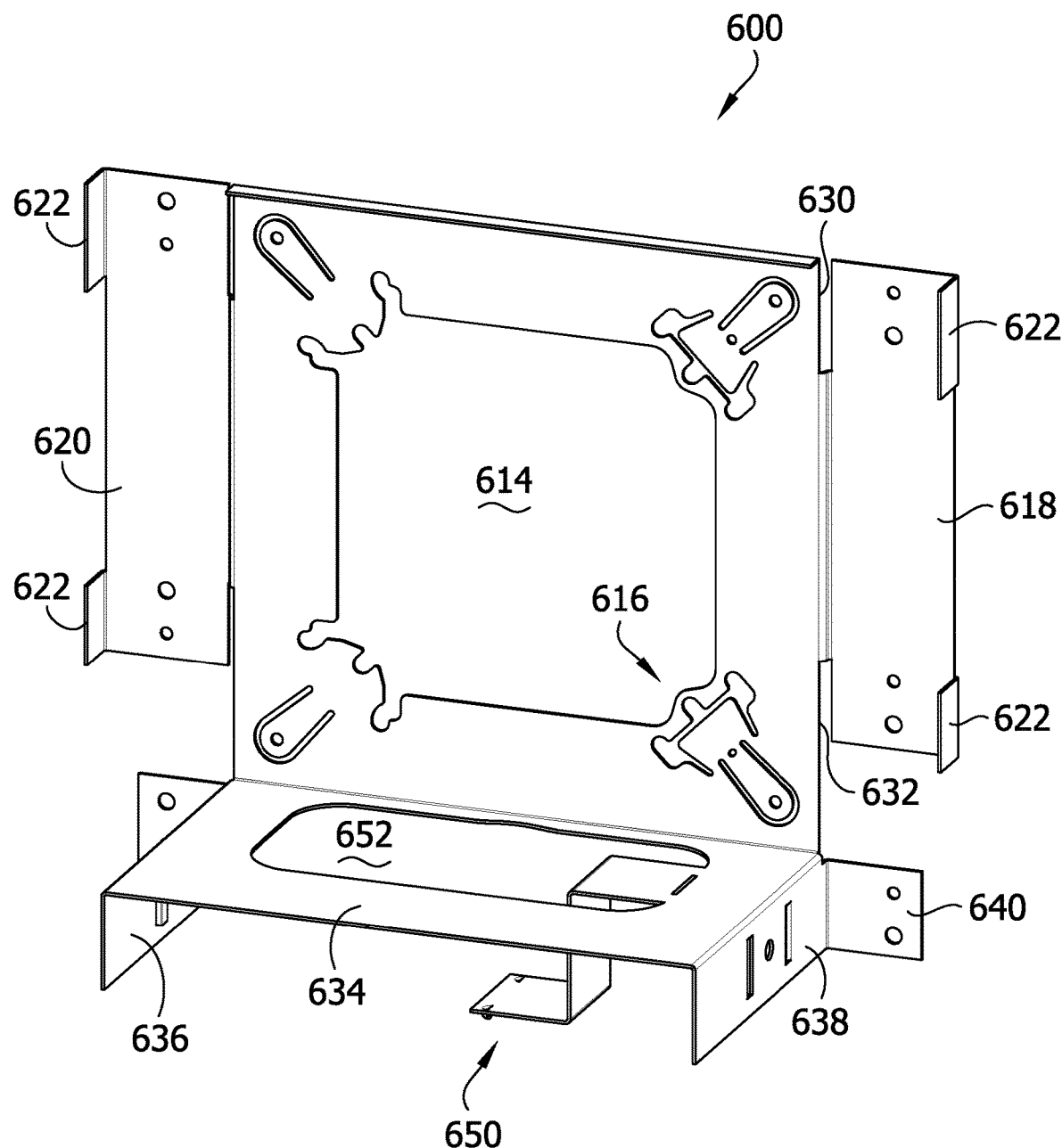
FIG. 24 is a perspective of another embodiment of a mounting bracket of the present disclosure showing a detachable leg attached to the mounting bracket in a shipped configuration.
Figure 25:
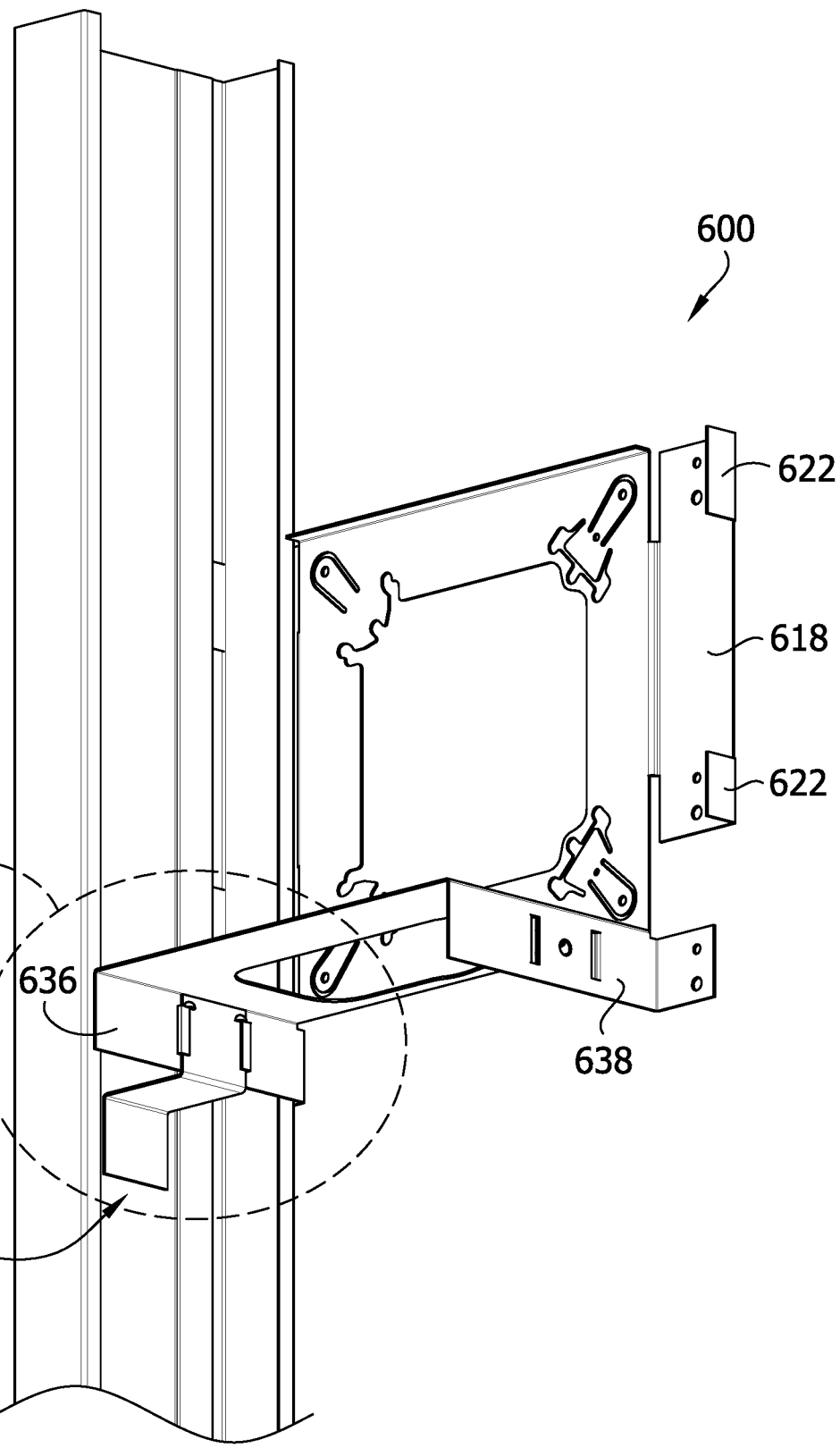
FIG. 25 is a perspective of the mounting bracket of FIG. 24 on a stud, the detachable leg attached to the mounting bracket in a stud mounting configuration.
Figure 26:
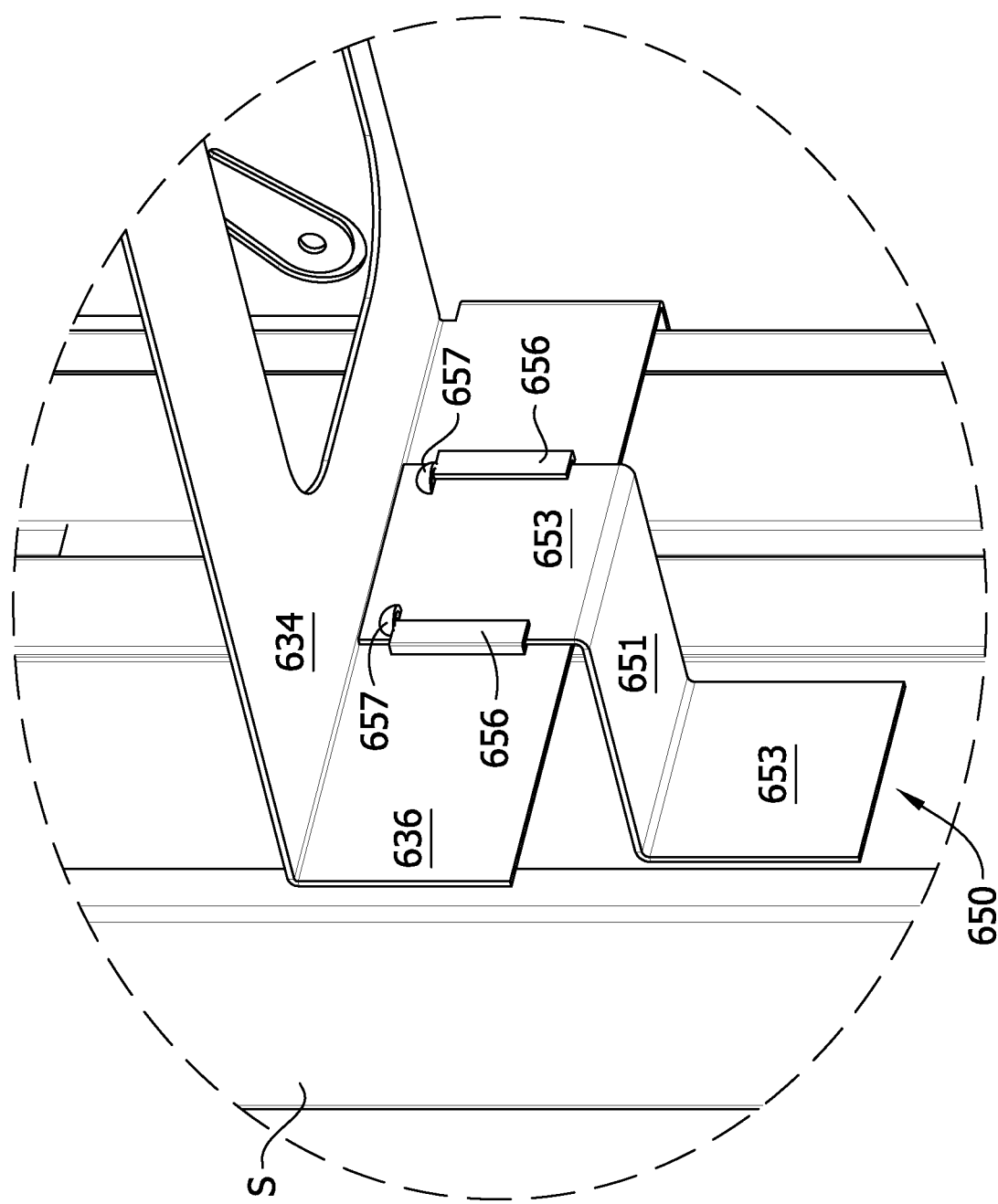
FIG. 26 is an enlarged, fragmentary perspective of FIG. 25.
Figure 27:
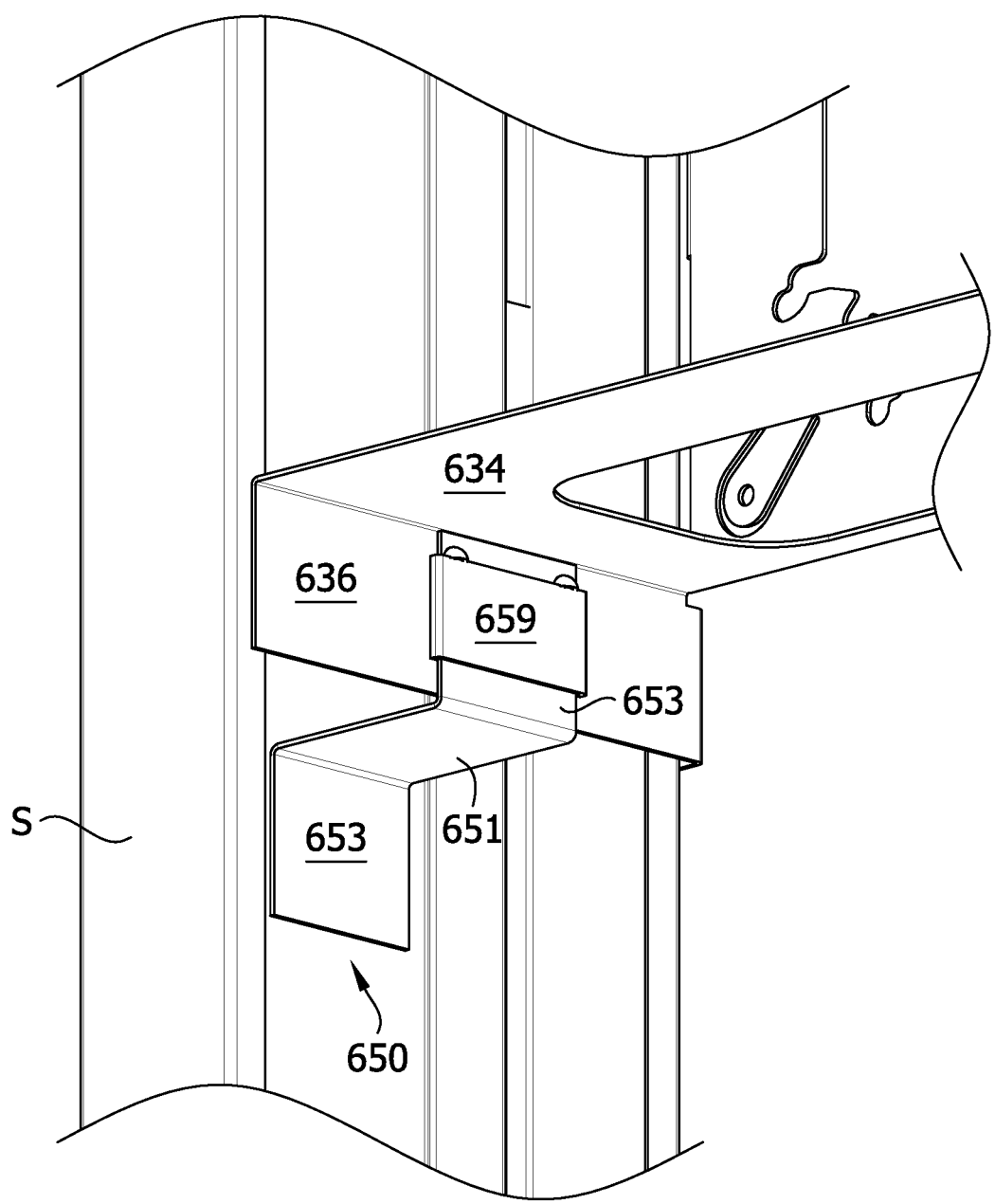
FIG. 27 is an enlarged, fragmentary perspective of another embodiment of a mounting bracket of the present disclosure on a stud, a detachable leg attached to the mounting bracket in a stud mounting configuration.

Referring to FIGS. 24-26, another embodiment of a mounting bracket for mounting a junction box J on a stud of a wall is generally indicated at reference numeral 600. Mounting bracket 600 is similar to mounting bracket 300 and, thus, for ease of comprehension, where similar or analogous parts are used, reference numerals "300 " units higher are employed. Mounting bracket 600 is similar to the mounting bracket 300 except that, among other things, mounting bracket 600 includes a leg 650 removably attached to the mounting bracket, specifically the base flange 634. A line of perforations 650 separates the leg 650 from the base flange 634, allowing the leg to be selectively snapped-off by an operator. The leg 650 has an elbow shape with a central flange 651 and opposite end flanges 653 extending away from each other from either end of the central flange. The end flanges 653 are generally perpendicular to the central flange. The leg 650 is configured to extend from one of the side flanges 636, 638 and engage the stud S to provide additional stability and support when the mounting bracket 600 is temporarily held on and then permanently secured to the stud S. In this embodiment, each side flange 636, 638 includes two opposing L-shaped flanges 656 defining a leg receiving space therebetween sized and shaped to receive one of the end flanges 653 when the leg is positioned in the stud mounting configuration, as shown in FIG. 26. Other ways of attaching the leg 650 are within the scope of the present disclosure. For example, as shown in FIG. 27, instead of L-shaped brackets, the side flange 636, 638 can includes a ribbon 659 attached thereto. The ribbon 659 and the side flange 636, 638 the ribbon is attached to define a leg receiving space there-between that end flange 653 of the leg 650 can be inserted into to secure (e.g., re-secure) the leg to the mounting bracket 600 after the leg is removed by the operator.

In either embodiment, when the leg 650 is inserted into one of the leg receiving spaces, the leg is temporarily and/or permanently secured to the side flange 636, 638 and extends toward the stud S such that one of the end flanges of the leg engages the stud, further stabilizing the mounting bracket 600. The leg 650 can have different lengths (e.g., distances between opposite end flanges) to engage studs S of different sizes. In the illustrated embodiment, the end flange 653 configured to be inserted between the side flange 636, 638 and L-shaped flanges 656 may include one or more detents 657. Each detent 657 engages one of the L-shaped flanges 656 to secure the leg 650 to the side flange 636, 638 and prevent the leg from unintentionally disconnecting from the side flange. In another embodiment, the side flanges 636, 638 and leg 650 may include fastener openings that align when the leg is attached to the side flange such that a fastener can be received therein to secure the leg to the side flange. It is also contemplated that the leg 650 is not permanently secured to the stud S and is, instead, removed after the leg has helped temporarily stabilize the mounting bracket 600 on the stud S while other parts (e.g., stud mounting flanges 618, 620) are secured to the stud with fasteners. The base flange 634 defines an opening 652 that the leg 650 extends into and below so that if the leg is not removed by the operator, the leg does not interfere with the attaching of a junction box J to the mounting bracket 600. In addition, the mounting bracket 600 also has box mounting opening sets 616 of a different configuration than mounting bracket 300. Otherwise, mounting bracket 600 is generally the same as mounting bracket 300 and operates in the same/similar way.

Figure 28:
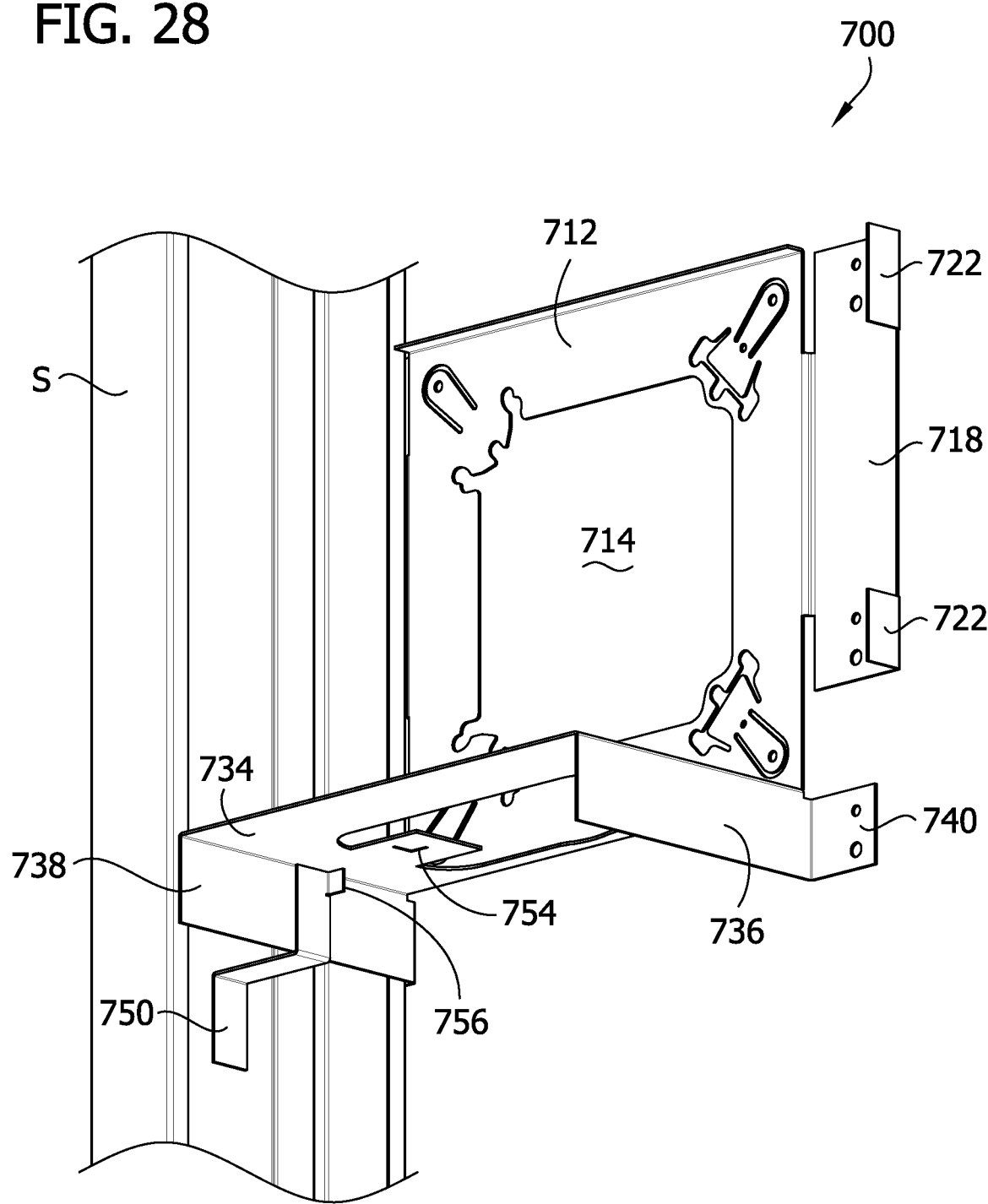
FIG. 28 is a bottom perspective of another embodiment of a mounting bracket of the present disclosure on a stud, a detachable leg attached to the mounting bracket in a stud mounting configuration.
Figure 29:
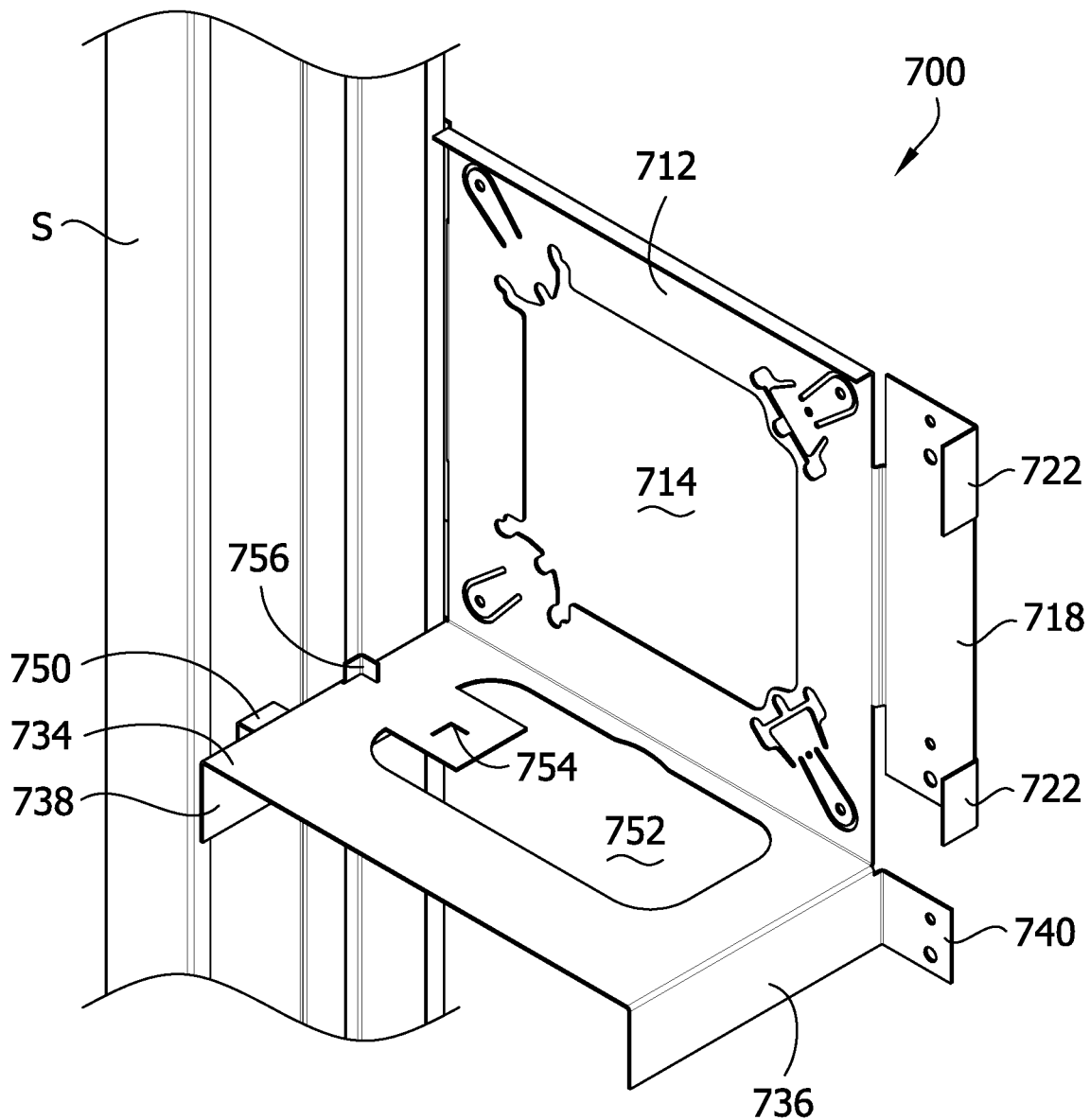
FIG. 29 is a top perspective thereof.
Figure 30:
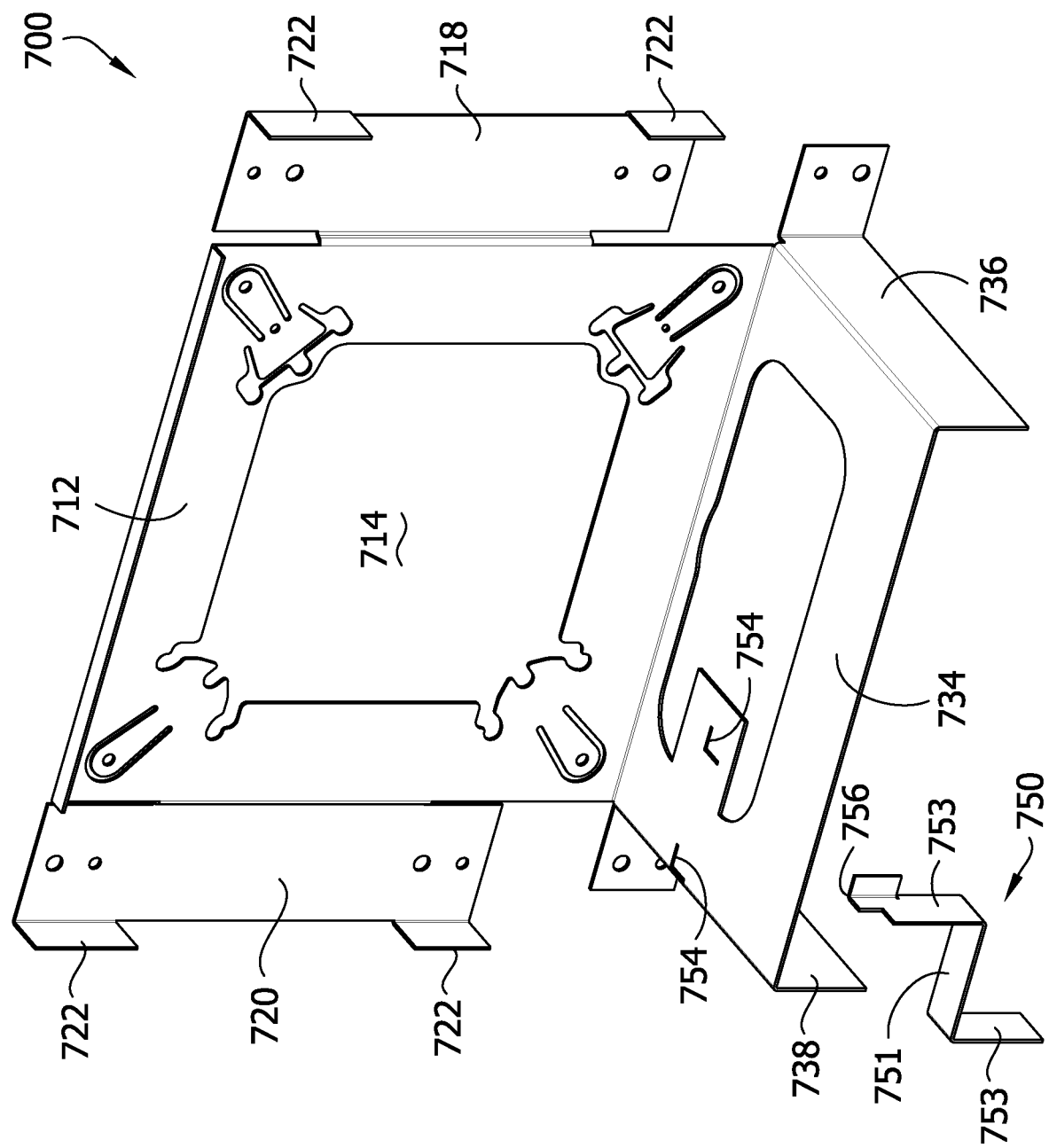
FIG. 30 is an exploded view of the mounting bracket and detachable leg of FIG. 28.

Referring to FIGS. 28-30, another embodiment of a mounting bracket for mounting a junction box J on a stud of a wall is generally indicated at reference numeral 700. Mounting bracket 700 is similar to mounting bracket 600 and, thus, for ease of comprehension, where similar or analogous parts are used, reference numerals "100" units higher are employed. Mounting bracket 700 is similar to the mounting bracket 600 except that the leg 750 includes an insert tab 756 extending from one of the end flanges 753 of the leg. The insert tab 756 has an L-shaped cross-section. The insert tab 756 is configured to be inserted into and extend through an L-shaped slot 754 defined by the base flange 734 to re-connect the leg 750 to the mounting bracket 700. Preferably, a frictional engagement between the insert tab 756 and the base flange 734 secures the leg 750 to the base flange (e.g., in the stud mounting configuration). The illustrated mounting bracket 700 includes two L-shaped slots 754 at different distances from the right edge margin of the base flange 734. The insert tab 756 is shown in FIGS. 28 and 29 received in the L-shaped slot 754 closest to the right edge margin of the base flange, which positions the leg 750 to engage the stud S when the mounting bracket 700 is mounted on the open side of the stud. The second L-shaped slot 754 further from the right edge margin of base flange 734 is positioned such that the leg 750 engages the stud S when the mounting bracket 700 is mounted on the closed side of the stud (not shown). In another embodiment, the mounting bracket 700 includes L-shaped slots toward the left edge margin of the base flange 734 (e.g., other side of the base flange) so that the leg 750 can be positioned to engage a stud S connected to the left side of the mounting bracket. Otherwise, mounting bracket 700 is generally the same as mounting bracket 600 and operates in the same/similar way.

Figure 31:
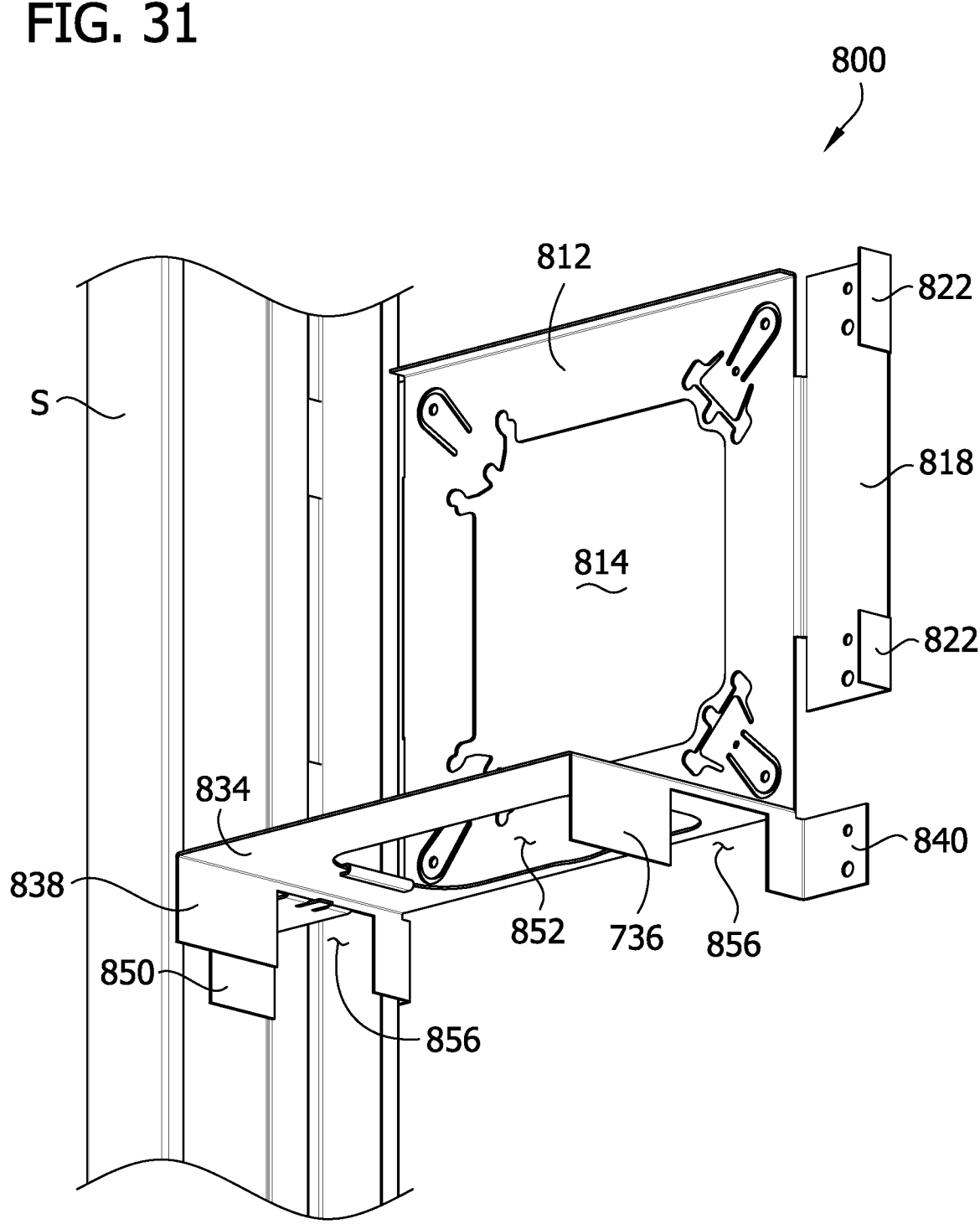
FIG. 31 is a perspective of another embodiment of a mounting bracket of the present disclosure on a stud, a detachable leg attached to the mounting bracket in a stud mounting configuration.
Figure 32:
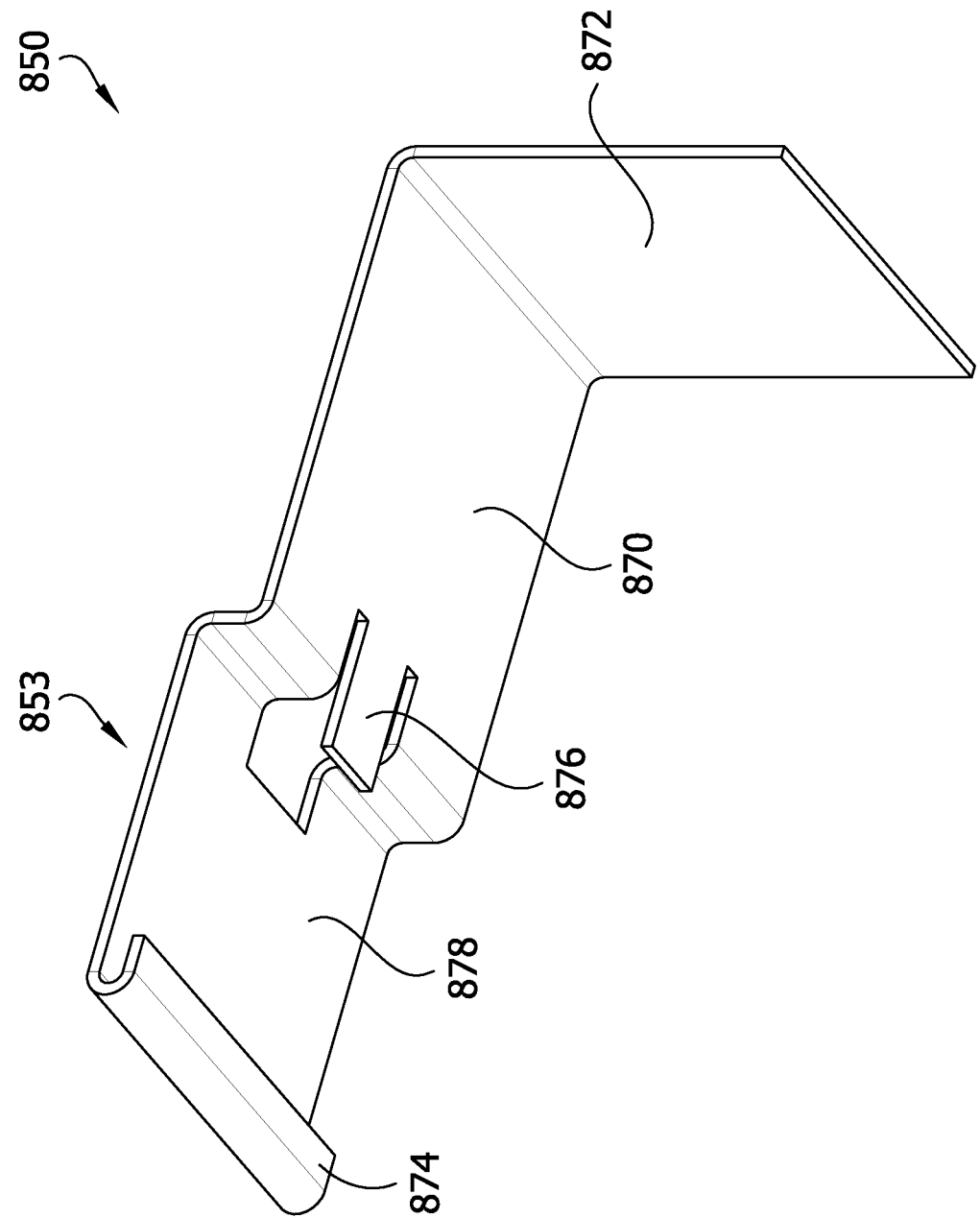
FIG. 32 is a perspective of the detachable leg of the mounting bracket of FIG. 31.

Referring to FIGS. 31 and 32, another embodiment of a mounting bracket for mounting a junction box J on a stud of a wall is generally indicated at reference numeral 800. Mounting bracket 800 is similar to mounting bracket 600 and, thus, for ease of comprehension, where similar or analogous parts are used, reference numerals "200" units higher are employed. Mounting bracket 800 is the generally the same as mounting bracket 600 except that the leg 850 has a clip 853 for re-securing (e.g., re-connecting) the leg to the mounting bracket. As shown in FIG. 32, the leg 850 has a central flange 870 and an end flange 872, as described above, but instead of another end flange, the leg includes a clip 853. The clip includes a hook 874 at one end configured to receive and overlap the edge margin of the base flange 834 defining the opening 852 therein and a tab 876 at the other end configured to engage an edge margin of either side flange 838, 836 that defines a cutout 856 (e.g., opening) therein. The illustrated tab 876 extends from the central flange 870 toward the hook 874. A clip flange 878 extends between and interconnects the central flange 870 and hook 874. The clip flange 878 is sized and shaped to position the hook 874 relative to the tab 876 so that the hook can engage the base flange 834 and the tab can engage one of the side flanges 836, 838 to connect (e.g., re-connect) the leg 850 to the mounting bracket 800. The clip flange 878 also engages the upper surface of the base flange 834 when the leg 850 is secured thereon.

To re-attach the leg 850 to the mounting bracket 800, as shown in FIG. 31, the tab is inserted into the cutout 856 and the clip 853 is pivoted downward to engage the clip flange 878 with the upper surface of the of the base flange 834 to position the hook 874 to overlap the edge margin of the base flange 834 defining the opening 852, thereby securing the leg 850 to the mounting bracket 800. Alternatively, the tab 876 is resiliently deflectable and the hook 874 is positioned such that it overlaps the edge margin of the base flange 834 and then the leg is moved downward and the deflectable tab 876 is deflected by the base flange and/or side flange 836, 838 until the deflectable tab enters the cutout 856, at which point the deflectable tab returns (e.g., snaps back) to its original shape and engage the side flange—securing the leg to the mounting bracket 800. In this embodiment, the central flange 870 may also be resiliently deflectable relative to the clip flange 878 to facilitate the deflection of the deflectable tab 876 to assist in attaching the leg 850 to the mounting bracket 800. Otherwise, mounting bracket 800 is generally the same as mounting bracket 600 and operates in the same/similar way.

Figure 33:
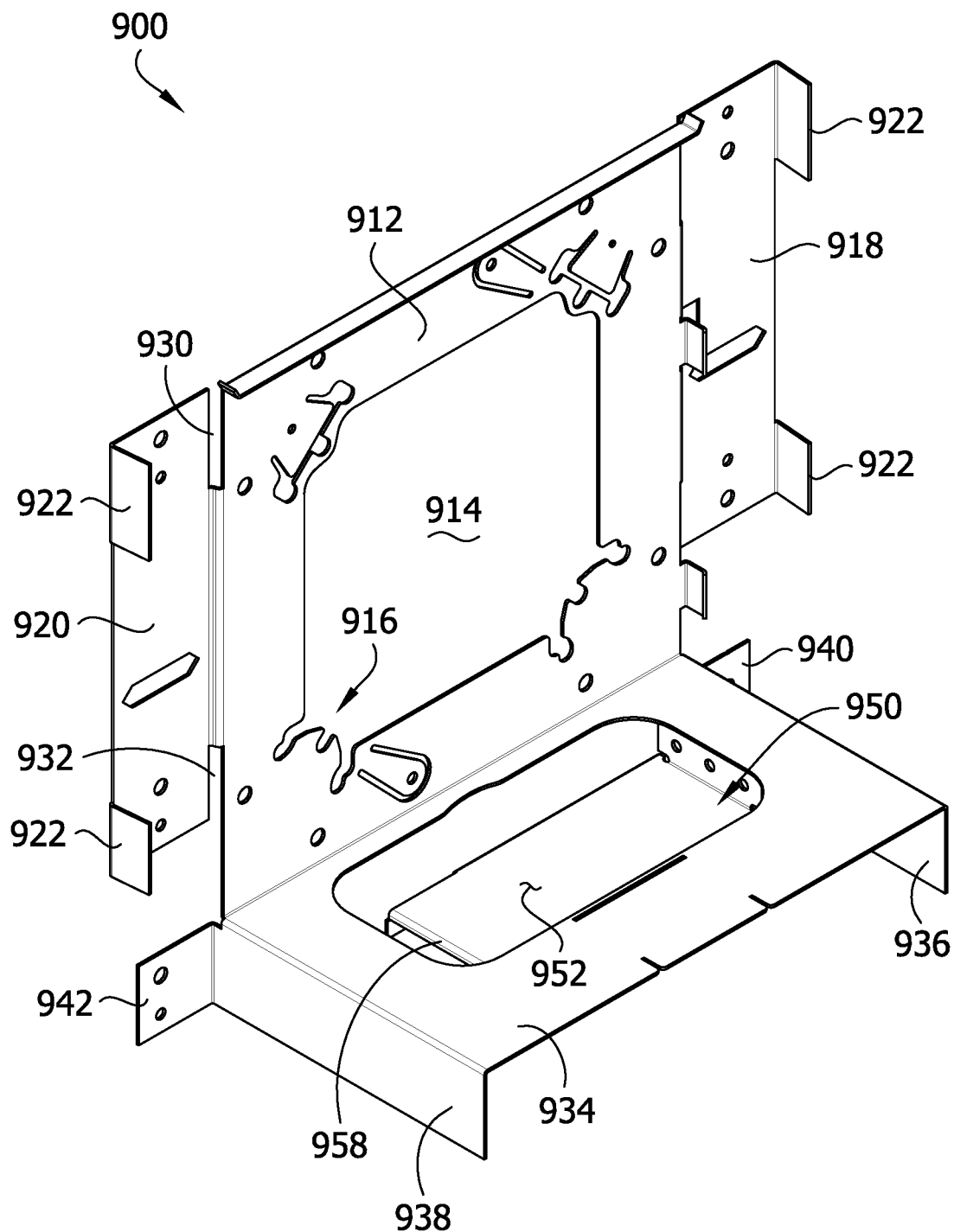
FIG. 33 is a perspective of another embodiment of a mounting bracket of the present disclosure showing a detachable leg attached to the mounting bracket in a shipped configuration.
Figure 34:
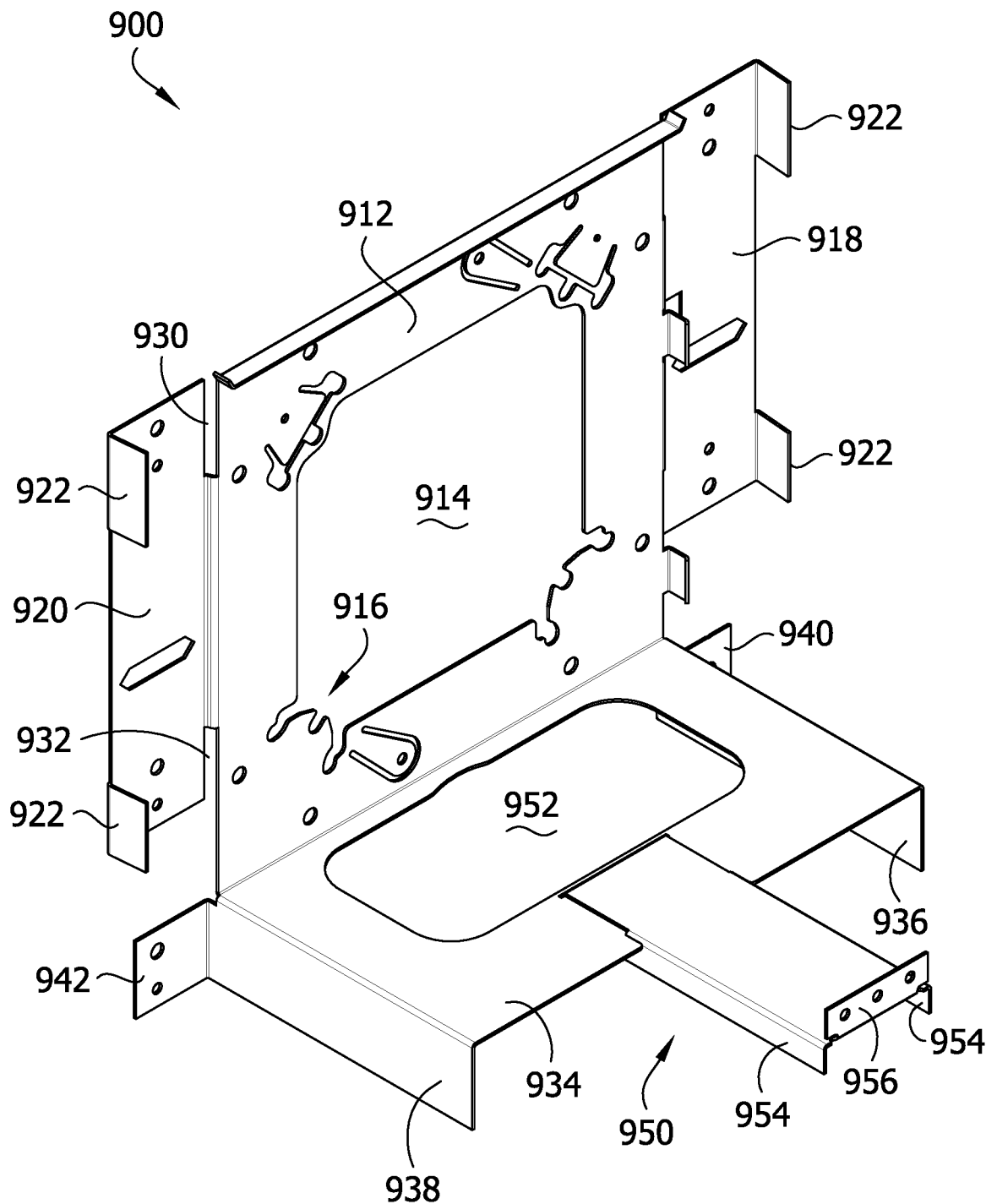
FIG. 34 is a perspective of the mounting bracket of FIG. 33 with the detachable leg attached to the mounting bracket at a first location.
Figure 35:
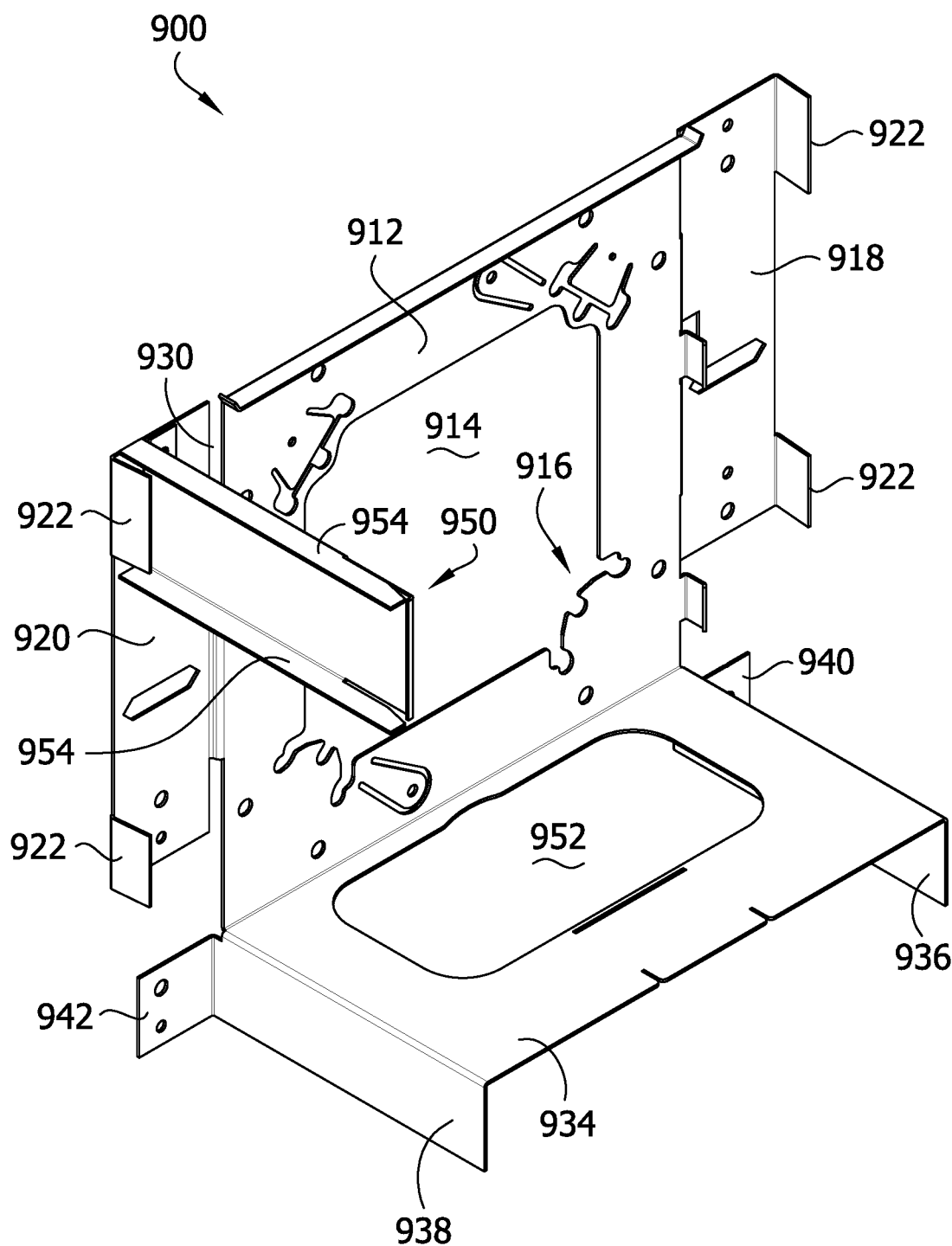
FIG. 35 is a perspective of the mounting bracket of FIG. 33 with the detachable leg attached to the mounting bracket in a second location.

Referring to FIGS. 33-35, another embodiment of a mounting bracket for mounting a junction box J on a stud of a wall is generally indicated at reference numeral 900. Mounting bracket 900 is similar to mounting bracket 10 and, thus, for ease of comprehension, where similar or analogous parts are used, reference numerals "900 " units higher are employed. Mounting bracket 900 is generally the same as mounting bracket 10 except that mounting bracket 900 has a similar configuration of clamping flanges 922 and upper and lower slots 930, 932 as mounting bracket 300, described above. In addition, mounting bracket 900 includes a detachable leg 950 that does not have an adjustable length (e.g., does not include guide slots 68, tab slots 70 and tabs 72) and is generally only used when the mounting bracket is attached to a single type of stud (e.g., studs having a specific depth). For example, the leg 950 may only be attached to the base flange 934 (e.g., first or stud mounting location) to engage the inside of the opposite face of the wall (e.g., drywall) when the mounting bracket 900 is mounted on a stud having a depth of 6 in. The base flange 934 defines an opening 952. The leg 950 can also be attached to either of the stud mounting flanges 918, 920 (e.g., a second location) of the mounting bracket 900, as shown in FIG. 35 and described above in relation to mounting bracket 10. Moreover, the mounting bracket 900 also has box mounting opening sets 916 of a different configuration than mounting bracket 10. In addition, in this embodiment, the leg 950 is removably connected to the base flange 934 with a line of perforations (not shown). Otherwise, mounting bracket 900 is generally the same as mounting bracket 10 and operates in the same/similar way.

Figure 36:
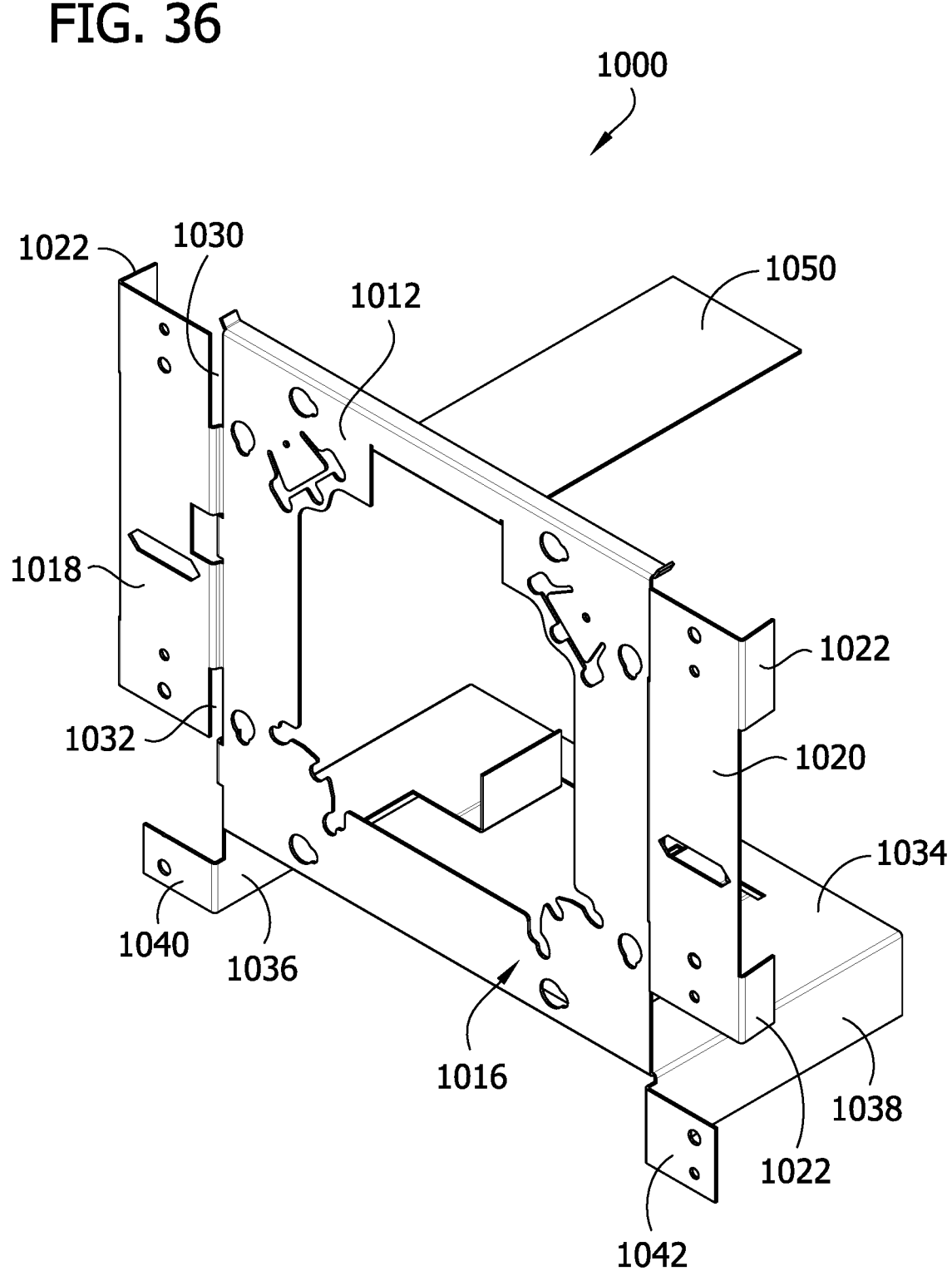
FIG. 36 is a perspective of another embodiment of a mounting bracket of the present disclosure.

Referring to FIG. 36, another embodiment of a mounting bracket for mounting a junction box J on a stud of a wall is generally indicated at reference numeral 1000. Mounting bracket 1000 is similar to mounting bracket 300 and, thus, for ease of comprehension, where similar or analogous parts are used, reference numerals "700 " units higher are employed. Mounting bracket 1000 is the generally the same as mounting bracket 300 except that mounting bracket 1000 includes an upper extension flange 1050 extending reward from the face plate 1012 above the central opening 1014. The upper extension flange 1050 is generally parallel to the base flange 1034. The upper extension flange 1050 provides additional support by engaging the inside of the opposite face of the wall, similar to the base flange 1034 and some of the detachable legs described above. In one embodiment, the upper extension flange 1050 may extend a distance from the face plate 1012 that is equal to the depth of the stud S and the base flange 1034 such that both the upper extension flange and base flange engage the inside of the opposite face of the wall. Other lengths and/or configurations of the upper extension flange are within the scope of this disclosure. For example, in one embodiment, the length of the upper extension flange 1050 may be adjustable such as by bending along perforation lines (not shown). In addition, the mounting bracket 1000 also has box mounting opening sets 1016 of a different configuration. Otherwise, mounting bracket 1000 is generally the same as mounting bracket 300 and operates in the same/similar way.

It is apparent that the elements, features and/or teachings set forth in each embodiment disclosed herein are not limited to the specific embodiment the elements, features and/or teachings are described in. Accordingly, it is understood that the elements, features and/or teachings described in one embodiment may be applied to one or more of the other embodiments disclosed herein.

Having described the invention in detail, it will be apparent that modifications and variations are possible without departing from the scope of the invention defined in the appended claims. For example, where specific dimensions are given, it will be understood that they are exemplary only and other dimensions are possible.

When introducing elements of the present invention or the illustrated embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A mounting bracket for mounting a junction box to a stud of a wall, the mounting bracket comprising:
   a face plate having opposite left and right edge margins, the face plate configured to attach to the junction box;
   a stud mounting flange coupled to one of the left and right edge margin of the face plate and configured to engage the stud;
   at least one clamping flange coupled to the stud mounting flange and configured to engage the stud, the at least one clamping flange being resiliently deflectable and configured to apply a force to the stud to hold the mounting bracket on the stud when the mounting bracket is mounted to the stud; and
   at least one slot configured to receive a clamping flange of a second mounting bracket when the mounting bracket and second mounting bracket are attached to one another in an overlapping, side-by-side arrangement.

2. The mounting bracket of claim 1, wherein each clamping flange includes at least one curved segment.

3. The mounting bracket of claim 2, wherein the at least one curved segment includes a first curved segment and a second curved segment, one of the first and second curved segments being configured to engage the stud to apply the force to the stud.

4. The mounting bracket of claim 3, wherein the first curved segment extends from the stud mounting flange and the second curved segment extends from the first curved segment, the second curved segment being configured to engage the stud.

5. The mounting bracket of claim 4, wherein the first curved segment curves inward toward the face plate and the second curved segment curves outward away from the face plate.

6. The mounting bracket of claim 1, wherein the face plate includes a plurality of mounting openings, each mounting opening being configured to receive and hold a fastener for attaching junction boxes of different sizes and/or orientations to the face plate.

7. The mounting bracket of claim 6, wherein at least one of the mounting openings is configured to receive and hold the fastener in any one of at least five different locations on the face plate.

8. The mounting bracket of claim 6, wherein at least one of the mounting openings is configured to receive and hold the fastener in any one of at least seven different locations on the face plate.

9. The mounting bracket of claim 1, wherein the at least one slot is defined at least in part by the face plate and the stud mounting flange.

10. The mounting bracket of claim 1, further comprising a second stud mounting flange coupled to the other of the left and right edge margins of the face plate and configured to engage the stud, and at least one clamping flange coupled to the second stud mounting flange and configured to engage the stud, the at least one clamping flange coupled to the second stud mounting flange being resiliently deflectable and configured to apply a force to the stud to hold the mounting bracket on the stud when the mounting bracket is mounted to the stud.

11. A mounting bracket for mounting a junction box to a stud of a wall, the mounting bracket comprising:
- a face plate having opposite upper and lower edge margins, the face plate configured to attach to the junction box; and
- a detachable leg releasably coupled to a first location on the mounting bracket and configured to uncouple from the first location of the mounting bracket and couple to the mounting bracket at a second location on the mounting bracket different from the first location wherein the detachable leg has a length extending between opposite ends of the detachable leg and wherein the length of the detachable leg is adjustable.

12. The mounting bracket of claim 11, wherein the face plate and detachable leg are a unitary, one piece construction.

13. The mounting bracket of claim 11, wherein the detachable leg changes a depth of the mounting bracket extending from a front to a back of the mounting bracket when the detachable leg is coupled to the second location on the mounting bracket.

* * * * *